United States Patent
Lee et al.

(10) Patent No.: US 10,447,460 B2
(45) Date of Patent: Oct. 15, 2019

(54) COMMUNICATION METHOD USING CARRIER AGGREGATION AND DEVICE FOR SAME

(71) Applicant: LG ELECTRONICS INC., Seoul (KR)

(72) Inventors: Seungmin Lee, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 69 days.

(21) Appl. No.: 15/510,165

(22) PCT Filed: Sep. 25, 2015

(86) PCT No.: PCT/KR2015/010226
§ 371 (c)(1),
(2) Date: Mar. 9, 2017

(87) PCT Pub. No.: WO2016/048099
PCT Pub. Date: Mar. 31, 2016

(65) Prior Publication Data
US 2017/0310452 A1    Oct. 26, 2017

Related U.S. Application Data

(60) Provisional application No. 62/056,481, filed on Sep. 27, 2014, provisional application No. 62/133,981,
(Continued)

(51) Int. Cl.
*H04J 3/00*    (2006.01)
*H04L 5/14*    (2006.01)
(Continued)

(52) U.S. Cl.
CPC .............. *H04L 5/14* (2013.01); *H04L 1/1812* (2013.01); *H04L 1/1854* (2013.01); *H04L 5/001* (2013.01);
(Continued)

(58) Field of Classification Search
USPC ....... 370/230, 236, 252, 280, 281, 328, 329, 370/330
See application file for complete search history.

(56) References Cited

U.S. PATENT DOCUMENTS 9,986,557 B2 *   5/2018   Moon ................... H04B 7/2656
2012/0294163 A1 *  11/2012  Turtinen ............. H04W 72/042
                                                            370/252
(Continued)

OTHER PUBLICATIONS

LG Electronics, "Considerations on HARQ-ACK and DCI for TDD-FDD CA," 3GPP TSG RAN WG1 Meeting #75, R1-135464, San Francisco, USA, Nov. 11-15, 2013, 7 pages, XP050735137.
(Continued)

*Primary Examiner* — Kwang B Yao
*Assistant Examiner* — Nguyen H Ngo
(74) *Attorney, Agent, or Firm* — Birch, Stewart, Kolasch & Birch, LLP

(57) ABSTRACT

The present invention relates to a method for transmitting and receiving a signal by a terminal in a wireless communication system supporting carrier aggregation. A method for transmitting and receiving a signal by a terminal can comprise the steps of: receiving configuration information about component carrier aggregation; on the basis of the configuration information, configuring a primary component carrier in a licensed band and configuring a secondary component carrier in an unlicensed band; transmitting data in a first subframe of the secondary component carrier; and receiving in a second subframe a response to the data. If the primary component carrier in the licensed band is configured
(Continued)

as a component carrier on a TDD mode, the second subframe can be configured on the basis of a HARQ-ACK timing in a first condition.

5 Claims, 12 Drawing Sheets

Related U.S. Application Data filed on Mar. 16, 2015, provisional application No. 62/144,354, filed on Apr. 8, 2015.

(51) Int. Cl.
*H04L 1/18* (2006.01)
*H04L 5/00* (2006.01)
*H04W 16/14* (2009.01)

(52) U.S. Cl.
CPC .......... *H04L 5/0055* (2013.01); *H04L 5/0098* (2013.01); *H04W 16/14* (2013.01)

(56) References Cited

U.S. PATENT DOCUMENTS

| | | | | |
|---|---|---|---|---|
| 2013/0258913 A1* | 10/2013 | Challa | .................. | H04J 3/06 370/280 |
| 2013/0272261 A1 | 10/2013 | Seo et al. | | |
| 2013/0343239 A1 | 12/2013 | Damnjanovic et al. | | |
| 2014/0010086 A1 | 1/2014 | Etemad et al. | | |
| 2014/0029484 A1* | 1/2014 | Choi | ..................... | H04J 3/1694 370/280 |
| 2015/0092703 A1* | 4/2015 | Xu | .......................... | H04L 5/003 370/329 |
| 2015/0109932 A1* | 4/2015 | Goldhamer | ....... | H04W 72/0453 370/236 |
| 2015/0200751 A1* | 7/2015 | Yin | ........................ | H04L 1/1887 370/280 |
| 2015/0245376 A1* | 8/2015 | Bashar | ..................... | H04L 1/18 370/277 |
| 2016/0157226 A1* | 6/2016 | Moon | .................. | H04B 7/2656 370/280 |
| 2017/0111106 A1* | 4/2017 | Lee | ..................... | H04B 7/2615 |
| 2018/0152268 A1* | 5/2018 | Gauvreau | ............ | H04W 16/24 |

OTHER PUBLICATIONS

Texas Instruments, "HARQ Considerations for TDD-FDD CA," 3GPP TSG RAN WG1 #75, R1-135615, San Francisco, USA, Nov. 11-15, 2013, pp. 1-3, XP0507325272.

Intel Corporation, "On Support of TDD-FDD Carrier Aggregation," 3GPP TSG-RAN WG1 #76, R1-140411, Prague, Czech Republic, Feb. 10-14, 2014, pp. 1-6.

Texas Instruments, "Further Details on HARQ Self-Scheduling for TDD-FDD CA," 3GPP TSG RAN WG1 #76, R1-140534, Prague, Czech Republic, Feb. 10-14, 2014, pp. 1-4.

* cited by examiner

FIG. 2
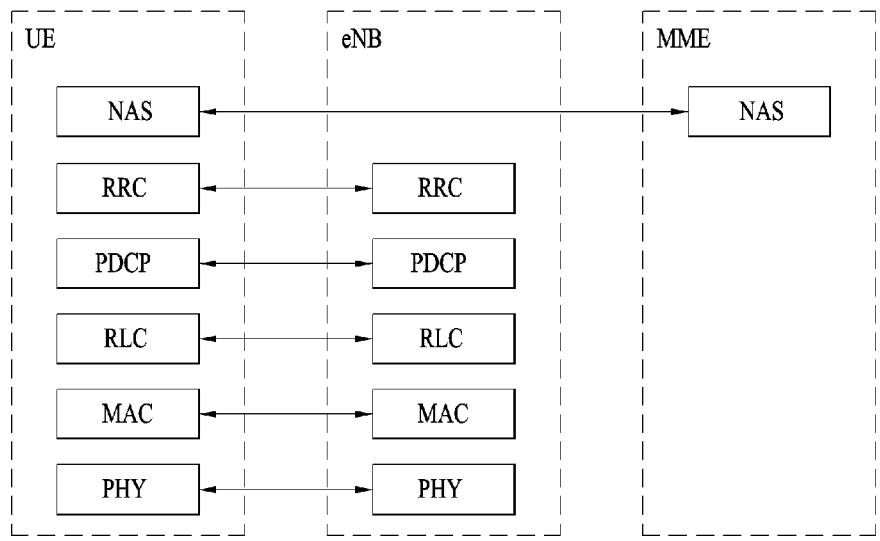
(a) Control-Plane Protocol Stack
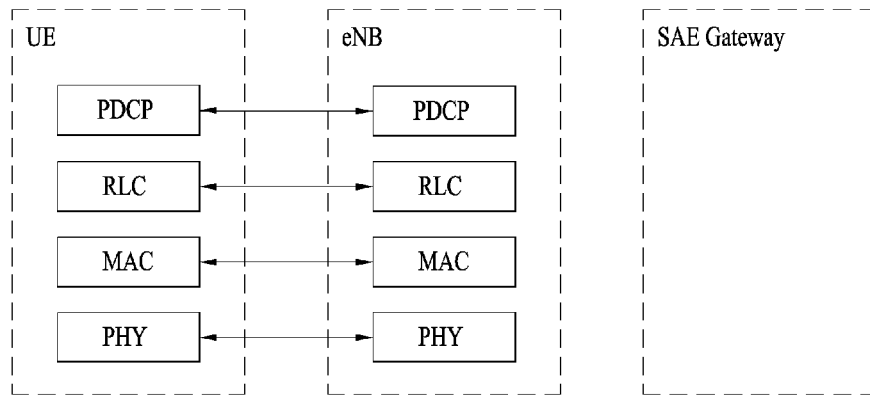
(b) User-Plane Protocol Stack FIG. 7
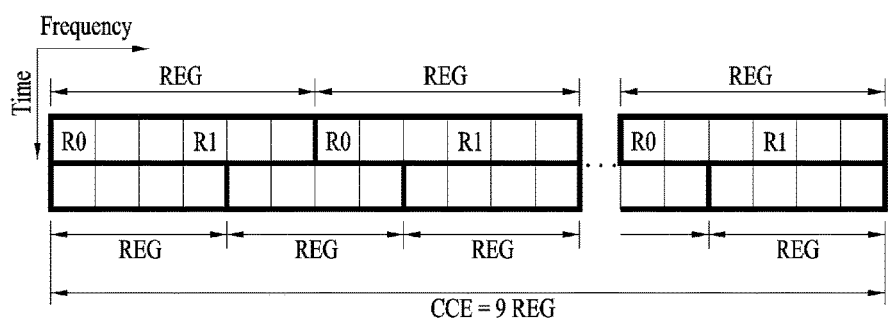
(a) 1-TX or 2-TX
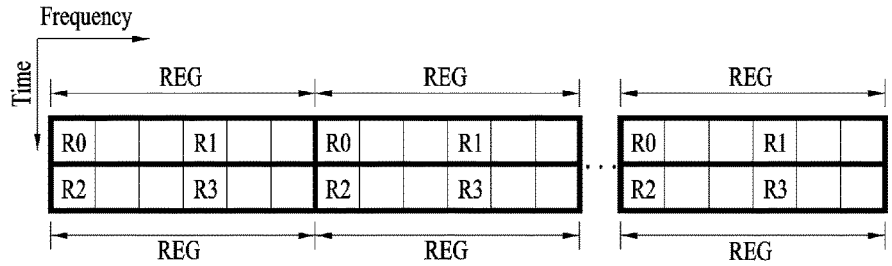
(b) 4-TX FIG. 11
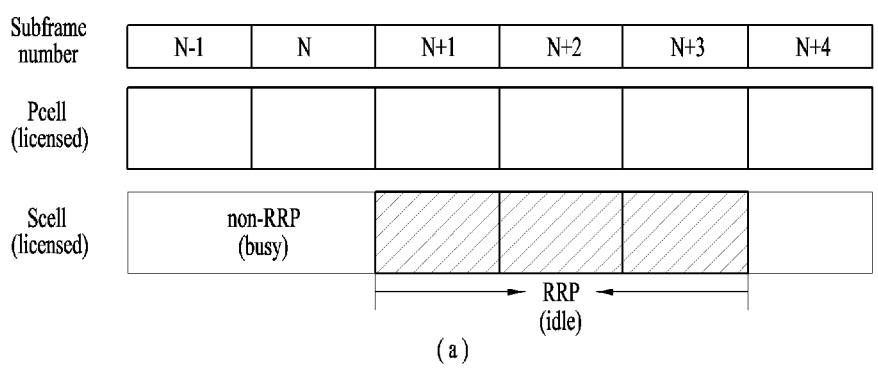
(a)
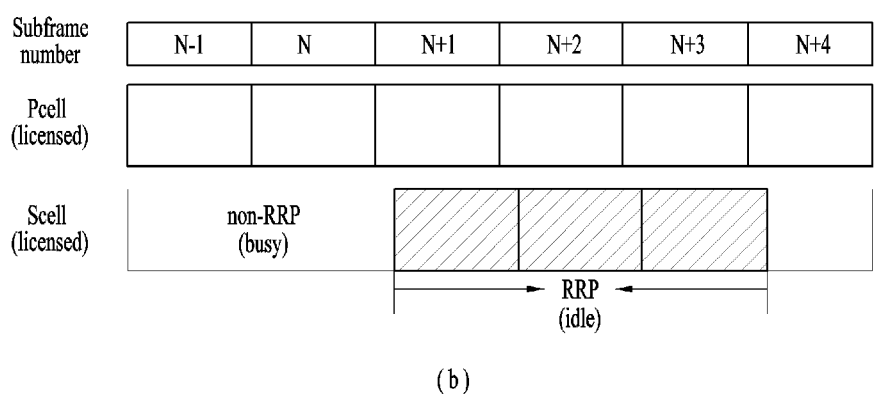
(b)

COMMUNICATION METHOD USING CARRIER AGGREGATION AND DEVICE FOR SAME

CROSS REFERENCE TO RELATED APPLICATIONS

This application is the National Phase of PCT International Application No. PCT/KR2015/010226, filed on Sep. 25, 2015, which claim priorities under 35 U.S.C. 119(e) to U.S. Provisional Application No. 62/056,481, filed on Sep. 27, 2014, 62/133,981, filed on Mar. 16, 2015 and 62/144,354, filed on Apr. 8, 2015, all of which are hereby expressly incorporated by reference into the present application.

TECHNICAL FIELD

The present invention relates to a wireless communication system and, more particularly, to a communication method using carrier aggregation and an apparatus therefor.

BACKGROUND ART

As an example of a wireless communication system to which the present invention is applicable, a 3rd generation partnership project long term evolution (3GPP LTE) (hereinafter, referred to as "LTE") communication system is described in brief.

FIG. 1 is a diagram schematically illustrating a network structure of an E-UMTS as an exemplary wireless communication system. An evolved universal mobile telecommunications system (E-UMTS) is an advanced version of a legacy universal mobile telecommunications system (UMTS) and basic standardization thereof is currently underway in the 3GPP. E-UMTS may be referred to as a long term evolution (LTE) system. For details of the technical specifications of UMTS and E-UMTS, reference can be made to Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information. In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although wireless communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

DETAILED DESCRIPTION OF THE INVENTION

Technical Problems

An object of the present invention is to provide a communication method using carrier aggregation in a wireless communication system and an apparatus therefor.

The technical objects that can be achieved through the present invention are not limited to what has been particularly described hereinabove and other technical objects not described herein will be more clearly understood by persons skilled in the art from the following detailed description.

Technical Solutions

To achieve these objects and other advantages and in accordance with the purpose of the invention, a method of transmitting a signal by a user equipment in a wireless communication system supporting carrier aggregation, the method comprising: receiving configuration information about component carrier aggregation; configuring a primary component carrier in a licensed band and configuring a second component carrier in an unlicensed band, based on the configuration information; transmitting data in a first subframe of the secondary component carrier; and receiving a response to the data in a second subframe, wherein, the second subframe is configured based on a hybrid automatic repeat and request acknowledgement/negative acknowledgement (HARQ-ACK) timing under a first condition when the primary component carrier is configured as a component carrier in a time division duplex (TDD) mode in the licensed band, and wherein the HARQ-ACK timing is configured based on uplink-downlink configuration information of the primary component carrier configured as the component carrier in the TDD mode.

To achieve these objects and other advantages and in accordance with the purpose of the invention, a user equipment for transmitting and receive a signal in a wireless communication system supporting carrier aggregation, the user equipment comprising: a radio frequency (RF) unit configured to transmit and receiving a signal; and a processor configured to control the RF unit, wherein the processor is further configured to: receive configuration information about component carrier aggregation using the RF unit, configure a primary component carrier in a licensed band and configures a second component carrier in an unlicensed band, based on the configuration information, transmit data in a first subframe of the secondary component carrier using the RF unit, and receive a response to the data in a second subframe using the RF unit, wherein the second subframe is configured based on a HARQ-ACK timing under a first condition when the primary component carrier is configured as a component carrier in a time division duplex (TDD) mode in the licensed band, and wherein the HARQ-ACK timing is configured based on uplink-downlink configuration information of the primary component carrier configured as the component carrier in the TDD mode.

The following description may be commonly applied to the embodiments of the present invention.

To achieve these objects and other advantages and in accordance with the purpose of the invention, the first condition is a state in which a TDD primary component carrier and a frequency division duplex (FDD) secondary component carrier are aggregated in the licensed band. The HARQ-ACK timing indicates a timing at which a response is received after data is transmitted on the FDD secondary component carrier under the first condition.

To achieve these objects and other advantages and in accordance with the purpose of the invention, the unlicensed band is a frequency band in which exclusive right to use is not guaranteed.

To achieve these objects and other advantages and in accordance with the purpose of the invention, the first subframe of the secondary component carrier is a downlink subframe. The first condition is a state in which the TDD primary component carrier and an FDD secondary component carrier are aggregated and the FDD secondary component carrier operates based on cross-carrier scheduling when a subframe of a TDD primary component carrier corresponding to the first subframe is configured as an uplink subframe and thus scheduling cannot be performed. The HARQ-ACK timing indicates a timing at which a response is received after data is transmitted on the FDD secondary component carrier operating based on the cross-carrier scheduling under the first condition.

To achieve these objects and other advantages and in accordance with the purpose of the invention, the first subframe is configured based on a time duration during which the secondary component carrier occupies and secures the unlicensed band.

To achieve these objects and other advantages and in accordance with the purpose of the invention, the HARQ-ACK timing is configured to be the same as a timing at which a response is received after data is transmitted on the TDD primary component carrier under the first condition.

To achieve these objects and other advantages and in accordance with the purpose of the invention, scheduling for downlink data of the secondary component carrier of the unlicensed band is configured based on multi-subframe scheduling. Downlink subframes in which scheduling can be performed on the secondary component carrier based on the multi-subframe scheduling are limited to downlink subframes in a bundling window. A response to data received in each of the downlink subframes in the bundling window is transmitted at the same uplink subframe timing.

To achieve these objects and other advantages and in accordance with the purpose of the invention, scheduling for downlink data of the secondary component carrier of the unlicensed band is configured based on multi-subframe scheduling and cross-carrier scheduling. The number and locations of downlink subframes of the secondary component carrier scheduled by multi-subframe scheduling are configured based on uplink-downlink configuration information about a TDD primary component carrier.

Advantageous Effects

According to the present invention, communication using carrier aggregation in a wireless communication system can be efficiently performed.

The effects that can be achieved through the present invention are not limited to what has been particularly described hereinabove and other advantages not described herein will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

FIG. 2 illustrates structures of a control plane and a user plane of a radio interface protocol between a UE and an E-UTRAN based on the 3GPP radio access network specification.

FIG. 7 illustrates a resource unit used to configure a DL control channel in an LTE system.

FIG. 11 is a diagram illustrating an exemplary method of occupying and using an unlicensed band.

BEST MODE FOR CARRYING OUT THE INVENTION

Figure 1:
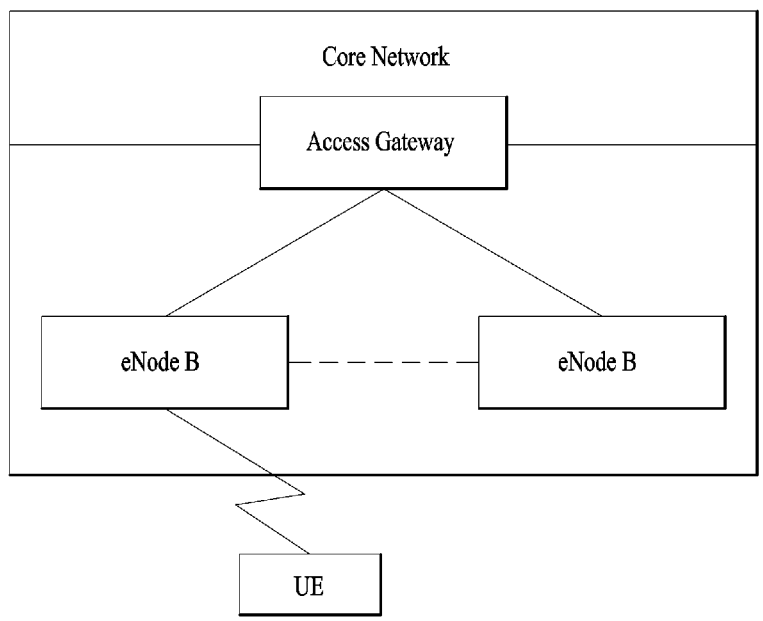
FIG. 1 illustrates a network structure of an E-UMTS as an exemplary wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
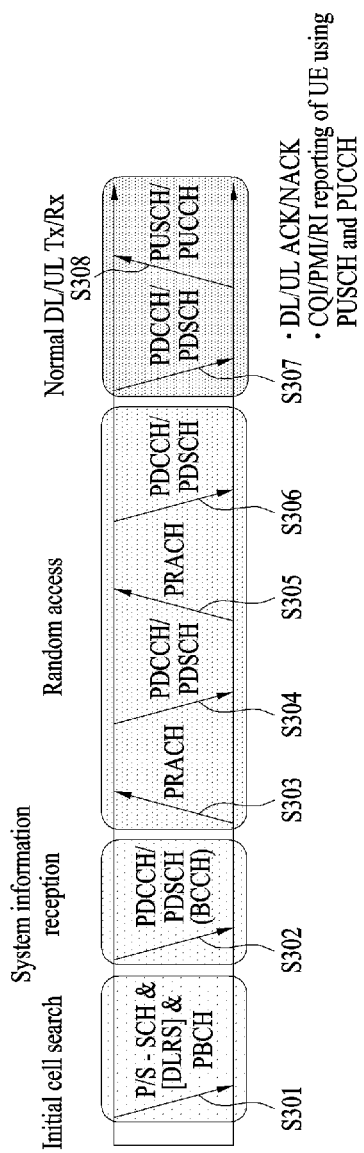
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
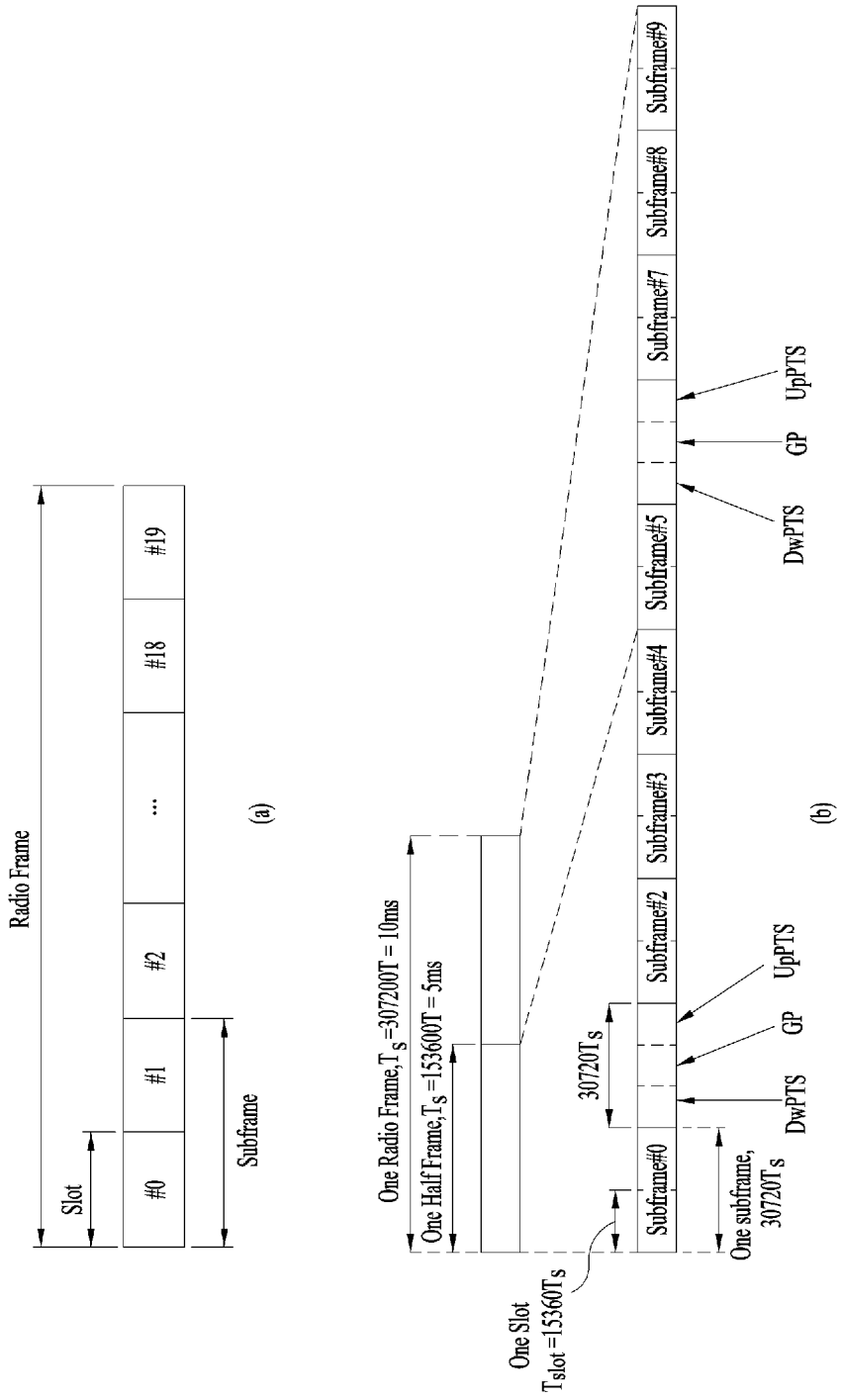
FIG. 4 illustrates the structure of a radio frame used in an LTE system.

FIG. 4 is a diagram illustrating the structure of a radio frame used in an LTE system.

Referring to FIG. 4, in a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating the structure of the type 1 radio frame. A DL radio frame includes 10 subframes, each subframe including two slots in the time domain. A time required to transmit one subframe is defined as a Transmission Time Interval (TTI). For example, one subframe may be 1 ms long and one slot may be 0.5 ms long. One slot includes a plurality of OFDM symbols in the time domain and a plurality of resource blocks (RBs) in the frequency domain. Since 3GPP LTE uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when the UE rapidly moves, the extended CP may be used in order to further reduce inter-symbol interference.

In the case of the normal CP, since one slot includes 7 OFDM symbols, one subframe includes 14 OFDM symbols. Up to the first three OFDM symbols of each subframe may be allocated to a PDCCH and the remaining OFDM symbols may be allocated to a PDSCH.

FIG. 4(b) illustrates the structure of the type 2 radio frame. The type 2 radio frame includes two half frames, each half frame including four general subframes each having two slots and one special subframe including a downlink pilot time slot (DwPTS), a guard period (GP), and an uplink pilot time slot (UpPTS).

In the special subframe, the DwPTS is used for initial cell search, synchronization, or channel estimation at a UE, and the UpPTS is used for channel estimation and UL transmission synchronization with a UE at an eNB. That is, the DwPTS is used for DL transmission and the UpPTS is used for UL transmission. Particularly, the UpPTS is used for transmission of a PRACH preamble or a sounding reference signal (SRS). The GP is used to cancel UL interference between UL and DL, caused by multi-path delay of a DL signal.

The current 3GPP standard specification defines the following configurations listed in Table 1 below for the special subframe. Table 1 illustrates DwPTSs and UpPTSs in the case where $Ts=1/(15000 \times 2048)$. The remaining region except for a DwPTS and an UpPTS is configured as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Meanwhile, the type 2 radio frame structure, that is, UL/DL subframe configurations in a TDD system are listed in Table 2.

TABLE 2

| Uplink downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. Table 2 further illustrates DL-to-UL switch point periodicities for the respective UL/DL subframe configurations in the system.

TABLE 3

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 3 shows a UL ACK/NACK timeline. This table indicates that, if a UE has received a PDCCH and a PDSCH scheduled by the PDCCH in subframe #(n-k) from an eNB, the UE transmits a UL ACK/NACK signal for the received PDSCH in subframe #n.

The ACK/NACK signal for the PDSCH is transmitted through a PUCCH which is a UL control channel. Information transmitted through the PUCCH varies with a format as summarized below.

In an LTE system, a PUCCH resource for ACK/NACK is not pre-allocated to each UE and a plurality of UEs within a cell separately use a plurality of PUCCH resources at each use time. Specifically, the PUCCH resource used by a UE for ACK/NACK transmission is implicitly determined based on a PDCCH that carries scheduling information for a PDSCH that delivers DL data. An entire area in which PDCCHs are transmitted in respective DL subframes includes a plurality of control channel elements (CCEs) and the PDCCH transmitted to the UE includes one or more CCEs. A CCE includes a plurality of (e.g., 9) resource element groups (REGs). One REG includes four contiguous REs except for a reference signal (RS). The UE transmits ACK/NACK on an implicit PUCCH resource that is derived or calculated by a function of a specific CCE index (e.g., the first or lowest CCE index) from among the indexes of CCEs included in a received PDCCH.

In this case, PUCCH resource indexes correspond to PUCCH resources for ACK/NACK transmission. If it is assumed that scheduling information for a PDSCH is transmitted to the UE through a PDCCH including CCE indexes 4, 5 and 6, the UE transmits ACK/NACK to the eNB through a PUCCH derived or calculated from CCE index 4 which is the lowest CCE index constituting the PDCCH, for example, through PDCCH index 4.

PUCCH format 1a/1b may transmit ACK/NACK information, PUCCH format 2/2a/2b may transmit CQI or both CQI and ACK/NACK information, and PUCCH format 3 may transmit multiple ACL/NACK information.

The above-described structure of the radio frame is purely exemplary and the number of subframes included in a radio frame, the number of slots included in a subframe, and the number of symbols included in a slot may be variously changed.

Figure 5:
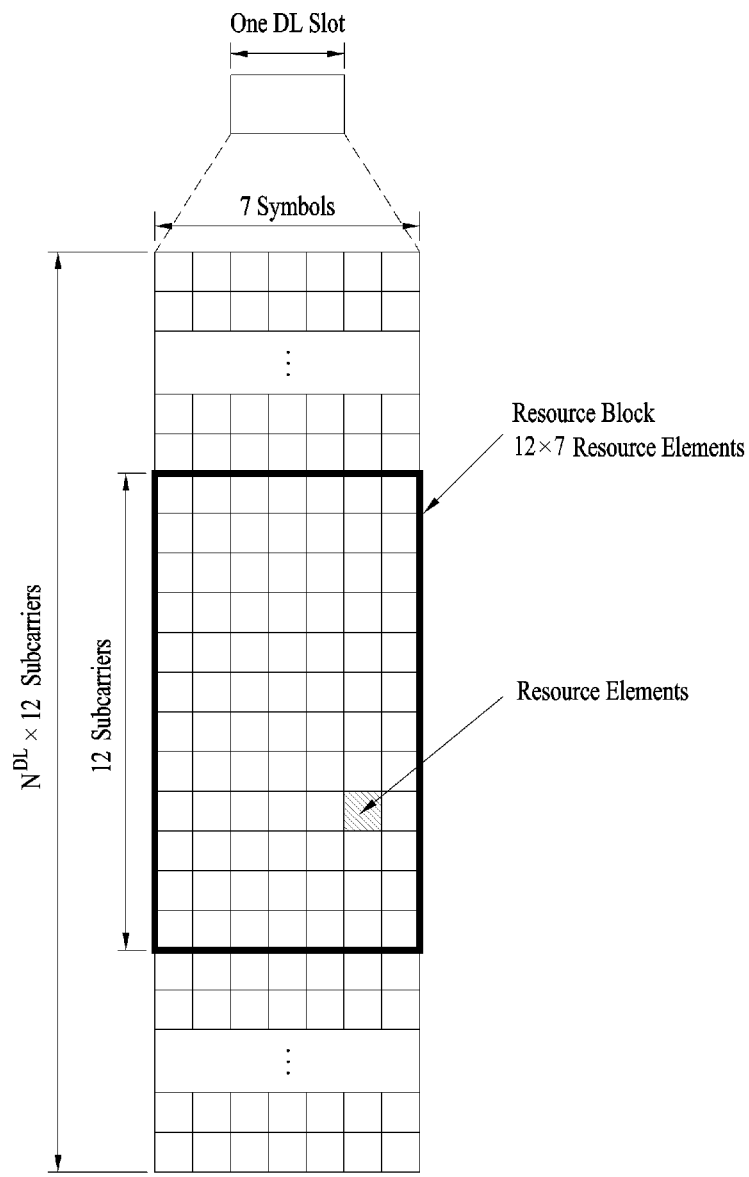
FIG. 5 illustrates a resource grid of a DL slot.

FIG. 5 illustrates a resource grid of a DL slot.

Referring to FIG. 5, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times N_{sc}^{RB}$ subcarriers in the frequency domain. Although FIG. 5 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE is indicated by one OFDM symbol index and one subcarrier index. One RB includes $N_{symb}^{DL} \times N_{sc}^{RB}$ REs. The number of RBs, $N_{RB}^{DL}$, included in a DL slot depends on DL bandwidth DL configured in a cell.

Figure 6:
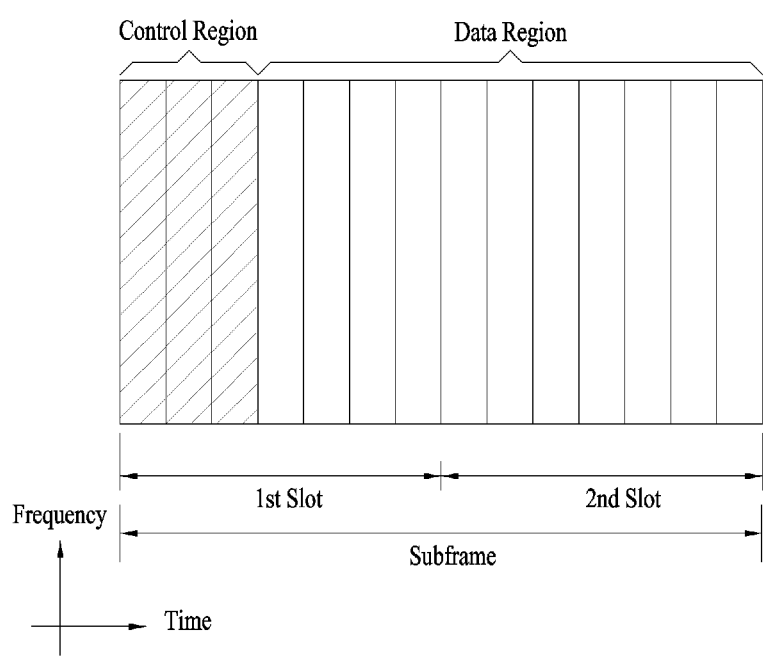
FIG. 6 illustrates the structure of a DL subframe.

FIG. 6 illustrates the structure of a DL subframe.

Referring to FIG. 6, up to three (or four) OFDM symbols at the start of the first slot of a DL subframe are used as a control region to which control channels are allocated and the other OFDM symbols of the DL subframe are used as a data region to which a PDSCH is allocated. DL control channels defined for the LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE includes a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked by an identifier (ID) (e.g., a radio network temporary identifier (RNTI)) according to the owner or use of the PDCCH. If the PDCCH is destined for a specific UE, the CRC may be masked by a cell-RNTI (C-RNTI) of the UE. If the PDCCH carries a paging message, the CRC thereof may be masked by a paging ID (P-RNTI). If the PDCCH carries system information (particularly, a system information block (SIB)), the CRC thereof may be masked by a system information RNTI (SI-RNTI). If the PDCCH is designated as a random access response, the CRC thereof may be masked by a random access-RNTI (RA-RNTI).

FIG. 7 illustrates a resource unit used to configure a DL control channel in an LTE system. Specifically, (a) of FIG. 7 illustrates a case of one or two transmit antennas in an eNB and (b) of FIG. 7 illustrates a case of 4 transmit antennas in an eNB. Only RS patterns differ according to the number of transmit antennas and resource units regarding control channels are configured in the same manner.

Referring to FIG. 7, a basic resource unit for a DL control channel is an REG. An REG includes 4 adjacent REs, except RSs. REGs are marked by bold lines in FIG. 7. The PCFICH and the PHICH include 4 REGs and 3 REGs, respectively. A PDCCH is configured in units of a CCE and one CCE includes 9 REGs.

To determine whether a PDCCH having L CCEs is transmitted to a UE, the UE is configured to monitor $M(L)(\geq L)$ contiguous CCEs or $M^{(L)}(\geq L)$ CCEs arranged according to a specific rule. The UE may consider a plurality of L values for PDCCH reception. CCE sets that the UE should monitor for PDCCH reception are called a search space. For instance, the LTE system defines search spaces as illustrated in Table 4.

TABLE 4

| | Search space $S_k^{(L)}$ | | Number of PDCCH |
|---|---|---|---|
| Type | Aggregation level L | Size [in CCEs] | candidates $M^{(L)}$ |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

A CCE aggregation level L indicates the number of CCEs constituting a PDCCH, $S_k^L$ indicates a search space with the CCE aggregation level L, and $M^L$ indicates the number of PDCCH candidates to be monitored in the search space with aggregation level L.

Search spaces may be categorized into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4 and 8. The common search space may overlap with the UE-specific search space.

For each CCE aggregation level, the position of the first CCE (a CCE having the smallest index) in a PDCCH search space allocated to a UE changes for the UE in every subframe. This is called PDCCH search space hashing.

The CCE may be distributed across a system band. More specifically, logically successive CCEs are input to an interleaver. The interleaver interleaves the input CCEs on an REG basis. Therefore, the frequency/time resources of one CCE are physically distributed across a total frequency/time area within the control region of a subframe. As a consequence, even though a control channel is configured with CCEs, interleaving is performed on an REG basis, thereby maximizing diversity and interference randomization gain.

Figure 8:
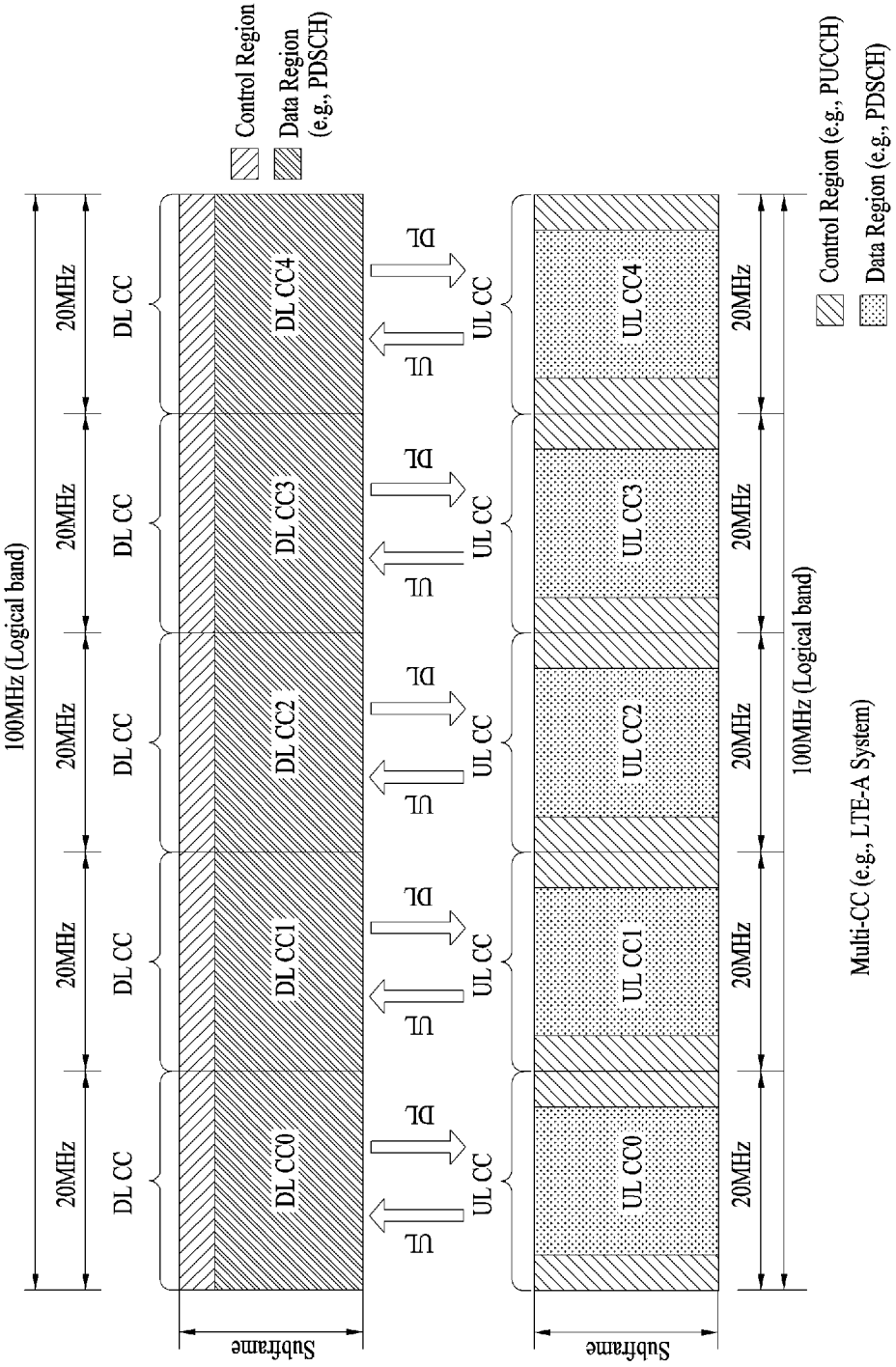
FIG. 8 illustrates a carrier aggregation (CA) communication system.

FIG. 8 illustrates a carrier aggregation (CA) communication system.

Referring to FIG. 8, a plurality of UL/DL component carriers (CCs) is aggregated to support a wider UL/DL bandwidth. The term "CC" may be replaced with other equivalent terms (e.g., carrier, cell, etc.). The CCs may be contiguous or non-contiguous in the frequency domain. The bandwidth of each CC may be independently determined. Asymmetric CA in which the number of UL CCs is different from the number of DL CCs may be configured. Meanwhile, control information may be configured to be transmitted and received only on a specific CC. Such a specific CC may be referred to as a primary CC (or anchor CC) and the other CCs may be referred to as secondary CCs.

If cross-carrier scheduling (or cross-CC scheduling) is applied, a PDCCH for DL allocation may be transmitted on DL CC#0 and a PDSCH corresponding to the PDCCH may be transmitted on DL CC#2. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling). The baseline of PDCCH transmission is summarized below.

CIF disabled: A PDCCH on a DL CC assigns PDSCH resources on the same DL CC or PUSCH resources on a single linked UL CC
    No CIF
    Same as an LTE PDCCH structure (same coding and same CCE-based resource mapping) and as a DCI format
    CIF enabled: A PDCCH on a DL CC can assign a PDSCH or PUSCH resource on a specific DL/UL CC among a plurality of aggregated DL/UL CCs using a CIF.
    Extended LTE DCI format with CIF
    CIF (if configured)) is a fixed x-bit field (e.g., x=3).
    CIF (if configured) location is fixed regardless of DCI format size.
    Reuse of the LTE PDCCH structure (same coding and same CCE-based resource mapping)

In the case of presence of CIF, an eNB may assign a PDCCH monitoring DL CC set for reduction of blind decoding complexity at a UE side. The PDCCH monitoring DL CC set is a portion of all aggregated DL CCs and includes one or more DL CCs. The UE performs detection/decoding of PDCCHs only on a corresponding DL CC. That is, upon scheduling a PDSCH/PUSCH for the UE, the eNB transmits a PDCCH only through the PDCCH monitoring DL CC set. The PDCCH monitoring DL CC set may be configured. UE-specifically, UE-group-specifically, or cell-specifically. The term "PDCCH monitoring DL CC" may be replaced with equivalent terms such as monitoring carrier and monitoring cell. A CC aggregated for the UE may be replaced with equivalent terms such as serving CC, serving carrier, and serving cell.

Figure 9:
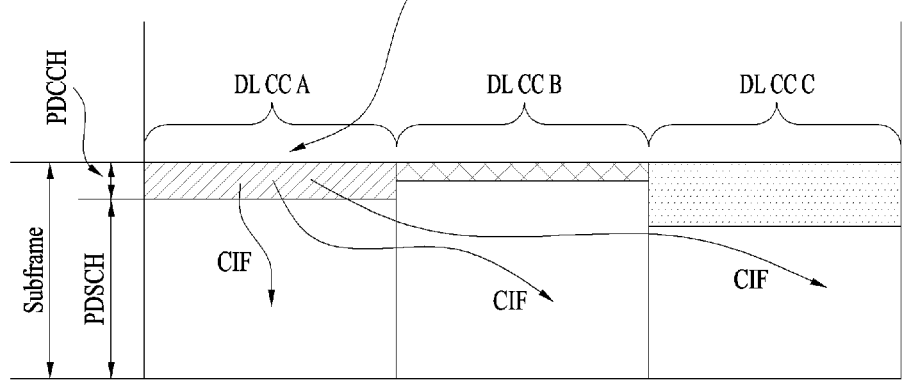
FIG. 9 illustrates scheduling when a plurality of carriers is aggregated.

FIG. 9 illustrates scheduling when a plurality of carriers is aggregated. It is assumed that 3 DL CCs are aggregated and DL CC A is configured as the PDCCH monitoring DL CC. If a CIF is disabled, each DL CC may transmit only a PDCCH that schedules a PDSCH thereof without the CIF according to LTE PDCCH configuration. On the other hand, if the CIF is enabled by UE-specific (or UE-group specific or cell-specific) higher layer signaling, DL CC A (a monitoring DL CC) may transmit PDCCHs that schedule not only a PDSCH of DL CCA but also PDSCHs of the other CCs, by using the CIF. In this case, no PDCCH is transmitted on DL CC B and C which are not configured as the PDCCH monitoring DL CC. Therefore, DL CC A (the monitoring DL CC) should include all of a PDCCH search space related to DL CC A, a PDCCH search space related to DL CC B, and a PDCCH search space related to DL CC C. In this specification, it is assumed that the PDCCH search spaces are defined per carrier.

As described above, LTE-A considers use of the CIF in a PDCCH, for cross-CC scheduling. Use or non-use of the CIF (i.e., support of a cross-CC scheduling mode or a non-cross-CC scheduling) and switching between modes may be semi-statically/UE-specifically configured through RRC signaling. After performing a corresponding RRC signaling procedure, the UE may recognize whether the CIF in a PDCCH that is to be scheduled therefor is used.

Figure 10:
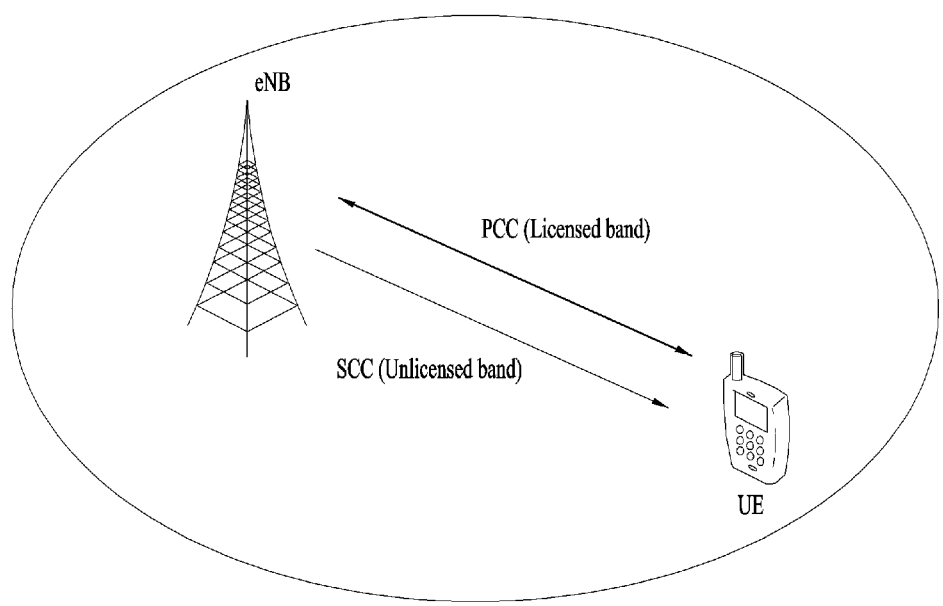
FIG. 10 is a diagram illustrating an exemplary method of using an unlicensed band.

FIG. 10 is a diagram illustrating an exemplary method of using an unlicensed band.

According to an embodiment of the present invention, even a cellular communication system such as an LTE system may use, for traffic offloading, an unlicensed band such as a band of 2.4 GHz used by a legacy Wi-Fi system or an unlicensed band such as a band of 5 GHz, which is newly in the spotlight.

For example, since the unlicensed band is based on wireless transmission/reception through contention between communication nodes, it is necessary for each communication node to confirm that other communication nodes do not perform signal transmission by performing channel sensing before signal transmission. Such channel sensing is called clear channel assessment (CCA). Even an eNB or a UE of the LTE system needs to perform CCA for signal transmission in the unlicensed band (hereinafter, referred to as an LTE-U band).

More specifically, the licensed band may be a frequency band that a communication service provider has exclusively secured the right to use through a procedure such as auction or purchase. That is, a specific frequency band in the licensed band can be used only by a specific entity that has obtained the right to use the licensed band and cannot be used by other users or service providers.

On the other hand, the unlicensed band may be a region in which an exclusive right to use frequency is not guaranteed. For example, the unlicensed band may be a frequency band that can be commonly used by many communication facilities or systems. Since the unlicensed band can be used without constraints by many communication facilities only if contiguous band protection of a predetermined level or more and interference related regulation in the band are observed, it may be difficult to secure communication quality of a level that a communication service through the licensed band in which an exclusive right to use frequency is guaranteed can provide.

As another example, the unlicensed band may be a region configured in consideration of temporal or spatial characteristics. For example, even when a specific service provider uses a specific frequency band, if the specific frequency band does not affect propagation of the specific service provider that temporally or spatially uses frequency bands under a predetermined condition, the specific frequency band may be the unlicensed band. As an example, a frequency band, such as a TV whitespace, that an unlicensed device is permitted to use under the condition that TV broadcasting is not hindered may be the unlicensed band.

Unlike the licensed band, the unlicensed band may represent a frequency region that is not exclusively occupied but is not limited to the above-described example. In consideration of the fact that the unlicensed band can be used by a plurality of users, the unlicensed band may be a region that is used based on a condition such as carrier sensing and other restrictions. Hereinafter, embodiments will be described taking into consideration the characteristics of such an unlicensed band.

When the eNB or the UE of the LTE system transmits a signal, other communication nodes such as a Wi-Fi node should not create interference by performing CCA. For example, in Wi-Fi standards (e.g., 801.11ac), a CCA threshold is specified as −62 dBm with respect to a non-Wi-Fi signal and as −82 dBm with respect to a Wi-Fi signal, which means that a station (STA) or an access point (AP) does not perform signal transmission so as to prevent interference when a signal other than the Wi-Fi signal is received at a power of −62 dBm or more. Characteristically, in a Wi-Fi system, the STA or the AP may perform CCA and perform signal transmission, unless signals greater than the CCA threshold are detected for 4 μs or more.

The present invention may be applied when the eNB transmits a signal to the UE or the UE transmits a signal to the eNB, as illustrated in FIG. 10, in a situation in which an LTE-A band, which is the licensed band, and an LTE-U band, which is the unlicensed band are carrier-aggregated.

For convenience of description of proposed methods below, while it is assumed that the UE is configured to perform radio communication through two CCs in each of the licensed band and the unlicensed band UE, the present invention is not limited to such an assumption.

A CC of the licensed band may be referred to as a primary CC (hereinafter, PCC or PCell) and a CC of the unlicensed band may be referred to as a secondary CC (hereinafter, SCC or SCell).

However, the proposed methods of the present invention may be extensively applied to a situation in which a plurality of licensed bands and a plurality of unlicensed bands are carrier-aggregated and a situation in which signal transmission and reception between the eNB and the UE is performed only in the unlicensed band and in the above-described situations. The proposed methods of the present invention may also be extensively applied to other systems as well as a 3GPP LTE system.

FIG. 11 is a diagram illustrating an exemplary method of occupying and using an unlicensed band.

In order to perform communication in an LTE-U band, an eNB and a UE should be capable of occupying/securing the corresponding band during a specific time duration through contention with other communication (e.g., Wi-Fi) systems. Hereinafter, the time duration occupied/secured for communication in the LTE-U band (referred to as a reserved resource period (RRP) duration for convenience) may be configured.

To secure the RRP duration, various methods may be used. Typically, there may be a method of transmitting a specific reservation signal so that other communication system devices such as a Wi-Fi device may recognize that a corresponding radio channel is busy or continuously transmitting an RS and/or a data signal so that a signal of a specific power level or more may be seamlessly transmitted during the RRP duration. Thus, if the eNB has determined the RRP duration during which the eNB desires to occupy the LTE-U band, the eNB may inform the UE of the RRP duration to cause the UE to maintain a communication transmission/reception link during the designated RRP duration.

As a scheme in which the eNB informs the UE of information about the RRP duration, the eNB may transmit the information to the UE through another CC (e.g., the LTE-A band) which is associated in a CA form.

As another example of an operation in the LTE-U band which operates according to a contention-based random access scheme, the eNB may perform carrier sensing (CS) before transmitting/receiving data. The eNB may check whether a current channel state of an SCell is busy or idle. If it is determined that the current channel state is idle, the eNB may transmit a scheduling grant through an (E)PDCCH of a PCell (i.e., through cross-carrier scheduling (CCS)) or through a PDCCH of the SCell and attempt to transmit/receive data.

In this case, for example, the eNB may configure an RRP duration including M consecutive subframes. Here, the eNB may pre-inform the UE of the M value and usage of the M subframes through higher layer signaling (using the PCell) or through a physical control/data channel.

A start timing of the RRP duration may be periodically (or semi-statically) configured through higher layer signaling. If the start timing of the RRP duration is desired to be set to subframe (SF) #n, the start timing of the RRP duration may be designated through physical layer signaling in SF #n or SF #(n-k).

Meanwhile, a subframe constituting the RRP may be configured such that a subframe boundary and a subframe number/index in a UCell are aligned with those in a Pcell (this case is referred to as "aligned-RRP") as illustrated in (a) of FIG. 11 and that a subframe boundary and a subframe number/index in the UCell are misaligned with those in the Pcell (this case is referred to as "floating-RRP") as illustrated in (b) of FIG. 11.

In the present invention, the meaning of "subframe boundaries between cells are aligned" is that an interval between subframe boundaries of two different cells is less than a specific time (e.g., CP length or X μsec where X≥0). In the present, a Pcell may represent a specific cell that is referenced to determine a subframe (and/or symbol) boundary of a UCell in terms of time (and/or frequency) synchronization.

Hereinafter, a HARQ-ACK feedback method will be described for a CA situation including a cell (or carrier) that can be aperiodically or discontinuously used on a CS basis in a band such as an LTE-U band.

More specifically, it may be necessary to define a HARQ-ACK feedback method upon configuring a PCell in a licensed band of an LTE system and configuring an SCell in an LTE-U band (hereinafter, UCell). That is, since a time duration capable of being aperiodically or discontinuously secured through contention with other systems on a CS basis is used, the HARQ-ACK feedback method also needs to be configured in consideration of the characteristics of an aperiodic or discontinuous UCell. In addition, the HARQ-ACK feedback method of the UCell needs to consider an HARQ-ACK feedback method applied to an LTE system for compatibility with a legacy system. Various embodiments of the HARQ-ACK feedback method when the UCell is used as the SCell will be described below.

Figure 12:
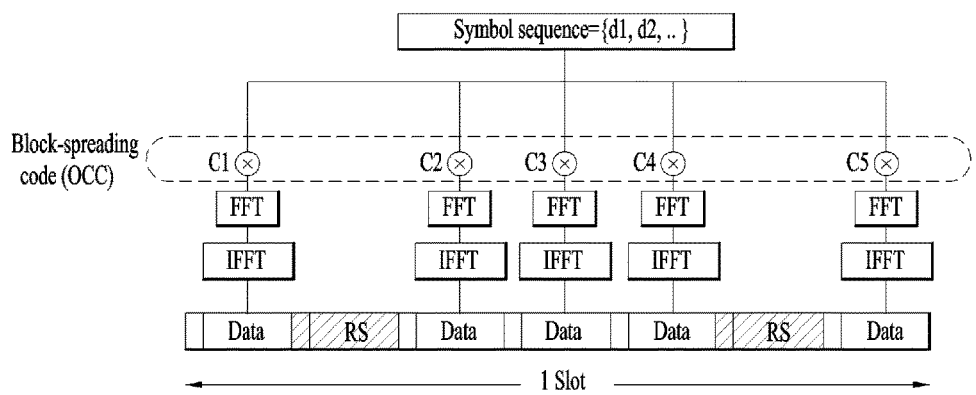
FIG. 12 is a diagram illustrating an exemplary PUCCH format based on block-spreading.

FIG. 12 is a diagram illustrating an exemplary PUCCH format based on block-spreading.

In an LTE-A system, it is considered to transmit, through a specific UL CC, a plurality of ACK/NACK information/signals for a plurality of PDSCHs transmitted through a plurality of DL CCs. To this end, as opposed to ACK/NACK transmission using PUCCH format 1a/1b in legacy Rel-8 LTE, the plural ACK/NACK information may be channel-coded (e.g., using a Reed-Muller code, tail-biting convolutional code, etc.) and the plural ACK/NACK information and/or control signals may be transmitted using PUCCH format 2 or a new PUCCH format (i.e., E-PUCCH format) of a modified type on a block-spreading basis.

A block-spreading scheme modulates control information (e.g., ACK/NACK, etc.) for transmission using an SC-FDMA scheme as opposed to a scheme of legacy LTE using PUCCH format 1 or 2 series. In the block-spreading scheme, a symbol sequence is spread in the time domain by an orthogonal cover code (OCC) as illustrated in FIG. 12. In this case, control signals of multiple UEs may be multiplexed to the same RB using the OCC.

For example, in PUCCH format 2, one symbol sequence is transmitted in the time domain and a UE performs multiplexing using a cyclic shift (i.e., CCS) of a CAZAC sequence, whereas, in a block-spreading based E-PUCCH format, one symbol sequence is transmitted in the frequency domain and the UE performs multiplexing using OCC based time-domain spreading.

As illustrated in FIG. 12 as an example, one symbol sequence is transmitted by generating five SC-FDMA symbols using a length-5 (SF=5) OCC. Although a total of two RS symbols is used during one slot in FIG. 12, a variety of applications, such as a scheme using three RS symbols and an OCC of SF=4, may be considered. Here, the RS symbols may be generated from a CAZAC sequence having a specific cyclic shift and may be transmitted in a form of applying (multiplying) a specific OCC by a plurality of RS symbols in the time domain.

For convenience of description, such a channel coding based scheme for transmitting a plurality of ACK/NACK signals using PUCCH format 2 or E-PUCCH format is referred to as a "multi-bit ACK/NACK coding" transmission method. In this method, an ACK/NACK coded block generated by channel-coding ACK/NACK or DTX information (indicating that a PDCCH is not received/detected) for a PDSCH of multiple DL CCs is transmitted. For example, if the UE receives two codewords (CWs) by operating in an SU-MIMO mode on any DL CC, the UE may transmit a total of four feedback states of ACK/ACK, ACK/NACK, NACK/ACK, and NACK/NACK per CW on the CC or may have a maximum of 5 feedback states including DTX.

If the UE receives a single CW, the UE may have a maximum of 3 states of ACK, NACK, and DTX (if NACK and DTX are identically processed, the UE may have a total of two states of ACK and NACK/DTX). Accordingly, if the UE aggregates a maximum of 5 DL CCs and operates in an SU-MIMO mode on all CCs, the UE may have a maximum of $5^5$ transmittable feedback states and an ACK/NACK payload size for representing these states is a total of 12 bits (if DTX and NACK are identically processed, the number of feedback states is $4^5$ and the ACK/NACK payload size for representing these states is a total of 10 bits).

The foregoing ACK/NACK multiplexing (i.e., ACK/NACK selection) method applied to a legacy Rel-8 TDD system basically considers an implicit ACK/NACK selection scheme which uses an implicit PUCCH resource corresponding to a PDCCH for scheduling each PDSCH of a UE (i.e., which is linked with a lowest CCE index) in order to secure a PUCCH resource of the UE.

Meanwhile, an LTE-A FDD system basically considers transmission of a plurality of ACK/NACK signals for multiple PDSCHs transmitted on a plurality of DL CCs through one UE-specifically configured UL CC. To this end, an "ACK/NACK selection" scheme is considered in which an implicit PUCCH resource linked with a PDCCH for scheduling a specific DL CC or partial or all DL CCs (i.e., linked with a lowest CCE index nCCE or linked with nCCE and nCCE+1) is used or a combination of the implicit PUCCH resource or an explicit PUCCH resource prescheduled for each UE through RRC signaling is used.

In addition, a situation in which a plurality of CCs is aggregated may be considered even in an LTE-A TDD system. Accordingly, it is considered that a plurality of ACK/NACK information/signals for a plurality of PDSCHs transmitted through a plurality of DL subframes and a plurality of CCs is transmitted through a specific CC (i.e., A/N CC) in UL subframes corresponding to the plural DL subframes. In this case, as opposed to LTE-A FDD, a scheme (i.e., full ACK/NACK) may be considered in which a plurality of ACK/NACK information/signals corresponding to a maximum number of CWs which can be transmitted on all CCs allocated to the UE is transmitted in all of a plurality of DL subframes. Alternatively, a scheme (i.e., bundled ACK/NACK) may be considered in which the number of transmitted ACK/NACK information/signals is reduced by applying ACK/NACK bundling with respect to a CW, CC, and/or subframe domain.

In this case, CW bundling represents that ACK/NACK bundling for a CW per CC is applied to each DL subframe and CC bundling represents that ACK/NACK bundling for all or partial CCs is applied to each DL subframe. In addition, subframe bundling represents that ACK/NACK bundling for all or partial DL subframes is applied to each CC.

As the subframe bundling method, an "ACK-counter" scheme indicating a total number of ACK signals (or a partial number of ACK signals) per CC with respect to all PDSCHs or DL grant PDCCHs received on each of CCs may be considered. In this case, a "multi-bit ACK/NACK coding" or "ACK/NACK selection" based ACK/NACK transmission scheme may be applied according to an ACK/NACK payload per UE, i.e., an ACK/NACK payload size for full or bundled ACK/NACK transmission configured per UE.

HARQ Timing for CA Between TDD and FDD

When a TDD PCell and an FDD SCell are carrier-aggregated, if ACK/NACK is transmitted through a UL subframe of the TDD PCell by applying a PDCCH/PDSCH-to-ACK/NACK timing (e.g., 4 ms) defined in a legacy FDD cell to an ACK/NACK timing transmitted on UL with respect to a PDSCH transmitted through an FDD cell, ACK/NACK cannot be transmitted in the case in which the TDD PCell is defined as a DL subframe at an ACK/NACK transmission timing. Accordingly, a new DL HARQ timing, rather than the PDCCH/PDSCH-to-ACK/NACK timing defined in the legacy FDD cell, may be applied in order to provide ACK/NACK transmission with respect to more DL subframes in the FDD cell. Likewise, a new HARQ timing may be applied to a UL HARQ timing. Exemplary HARQ timings are described below.

1) DL HARQ Timing for FDD PCell and TDD SCell 1-1) Self-Scheduling

When the TDD SCell receives control information through self-scheduling and receives a PDSCH, a HARQ timing for the PDSCH may be configured to be the same as a HARQ timing of the FDD PCell. For example, ACK/NACK information may be transmitted through a PCell and the HARQ timing for the PDSCH may be configured to be the same as a HARQ timing of the PCell.

1-2) Cross-Carrier Scheduling

When the TDD SCell receives control information through CCS and receives the PDSCH, the HARQ timing for the PDSCH may be configured to be the same as a HARQ timing of the FDD PCell. For example, ACK/NACK information may be transmitted through the PCell and the HARQ timing for the PDSCH may be configured to be the same as a HARQ timing of the PCell.

2) UL HARQ Timing for FDD PCell and TDD SCell 2-1) Self-Scheduling

When the TDD SCell receives control information through self-scheduling and transmits a PUSCH, a HARQ timing for the PUSCH may be configured based on a HARQ timing of a TDD scheduled cell.

2-2) Cross-Carrier Scheduling

When the TDD SCell receives control information from an FDD scheduling cell and transmits the PUSCH, the HARQ timing for the PUSCH may be configured based on the HARQ timing of the TDD scheduled cell.

In addition, when the TDD SCell receives control information from an FDD scheduling cell and transmits the PUSCH, ACK/NACK information may be received through a PHICH 6 ms after the PUSCH is transmitted.

In addition, when the TDD SCell receives control information from the FDD scheduling cell and transmits the PUSCH, reference UL-DL configuration for a HARQ timing is derived by a scheduling cell and a timing may be configured based on UL-DL configuration information.

3) DL HARQ Timing for TDD PCell and FDD SCell 3-1) Self-Scheduling

When the FDD SCell receives control information through self-scheduling and receives the PDSCH, the HARQ timing for the PDSCH may be configured to be the same as a timing of the TDD PCell based on UL-DL configuration information of the TDD PCell. The HARQ timing for the PDSCH may be configured in consideration of additional information about a DL subframe that is not defined in the timing of the TDD PCell.

When the FDD SCell receives control information through self-scheduling and receives the PDSCH, a HARQ timing for the PDSCH may be configured based on reference UL-DL configuration defined for the FDD SCell. The reference UL-DL configuration may be configured based on UL-DL configuration of the TDD PCell. As described above, the HARQ timing for the PDSCH may be configured in consideration of additional information about a DL subframe that is not defined in a timing of the TDD PCell.

3-2) Cross-Carrier Scheduling

When the FDD SCell receives control information through CCS and receives the PDSCH, the HARQ timing for the PDSCH may be configured to be the same as in the above self-scheduling case. Alternatively, in CCS, the HARQ timing for the PDSCH may be configured to be the same as the HARQ timing of the TDD PCell.

4) UL HARQ Timing for TDD PCell and FDD SCell 4-1) Self-Scheduling

When the FDD SCell receives control information through self-scheduling and transmits the PUSCH, the HARQ timing for the PUSCH may be configured based on a HARQ timing of an FDD scheduled cell.

4-2) Cross-Carrier Scheduling

When the FDD SCell receives control information from a TDD scheduling cell and transmits the PUSCH, the HARQ timing for the PUSCH may be configured based on the HARQ timing of the TDD scheduled cell.

In addition, when the FDD SCell receives control information from the TDD scheduling cell and transmits the PUSCH, ACK/NACK information may be received through a PHICH 6 ms after the PUSCH is transmitted.

In addition, when the FDD SCell receives control information from the FDD scheduling cell and transmits the PUSCH, the HARQ timing for the PUSCH may be configured to be the same as a HARQ timing of the FDD scheduling cell.

Examples of a HARQ timing (e.g., DL association set index) applicable in the above-described DL HARQ timing are listed below in Table 5. In Table 4, UL-DL configuration may correspond to U/D configuration of the TDD PCell and a HARQ timing may be a type/index of a HARQ timing configured for corresponding TDD PCell U/D configuration. As described above, a DL association set index as information about an added DL subframe may correspond to "[ ]". That is, IF may indicate a newly generated DL association set index for corresponding TDD PCell U/D configuration.

In addition, examples of reference U/D configuration applicable to the FDD SCell in the above-described DL HARQ timing are listed below in Table 6, Table 7, and Table 8.

which an available resource duration is aperiodically or discontinuously secured as in an LTE-U band system that opportunistically operates based on a CS operation in an unlicensed band.

TABLE 5

| UL-DL Conf. | HARQ timing | \multicolumn{10}{c}{Subframe n} |
|---|---|---|---|---|---|---|---|---|---|---|---|
| | | 0 | 1 | 2 | 3 | 4 | 5 | 6 | 7 | 8 | 9 |
| 0 | 0A | — | — | 6, [5] | [5], [4] | 4 | — | — | 6, [5] | [5], [4] | 4 |
| 0 | 0B | — | — | 6, [5], [4] | | [5], 4 | — | — | 6, [5], [4] | | [5], 4 |
| 1 | 1 | — | — | 7, 6, [5] | [5], 4 | — | — | — | 7, 6, [5] | [5], 4 | — |
| 1 | 1* | — | — | 7, 6 | [6], [5], 4 | — | — | — | 7, 6 | [6], [5], 4 | — |
| 2 | 2 | — | — | 8, 7, 6, [5], 4 | — | — | — | — | 8, 7, 6, [5], 4 | — | — |
| 3 | 3 | — | — | 11, [10], [9], [8], 7, 6 | 6, 5 | 5, 4 | — | — | — | — | — |
| 3 | 3a | — | — | 11, [10], 7, 6 | [10], 6, 5 | [10], 5, 4 | | | | | |
| 4 | 4 | — | — | 12, 11, [10], [9], 8, 7 | 7, 6, 5, 4 | | | | | | |
| 4 | 4a | — | — | 12, 11, [10], 8, 7 | [10], 7, 6, 5, 4 | | | | | | |
| 5 | 5 | — | — | 13, 12, 11, [10], 9, 8, 7, 6, 5, 4 | — | | | | | | |
| 6 | 6 | — | — | [8], 7 | 7, [6] | [6], 5 | — | — | 7 | 7, [6], [5] | — |
| 6 | 6* | — | — | 7 | 7, [6], [5] | 5 | — | — | 7, [6], [5], [4] | 7 | — |

TABLE 6

| TDD PCell U/D configuration | Allowed reference configuration for FDD SCell |
|---|---|
| 0 | {0, 1, 2, 3, 4, 5, 6} |
| 1 | {1, 2, 4, 5} |
| 2 | {2, 5} |
| 3 | {3, 4, 5} |
| 4 | {4, 5} |
| 5 | {5} |
| 6 | {1, 2, 3, 4, 5, 6} |

TABLE 7

| TDD PCell U/D configuration | Allowed reference configuration for FDD SCell |
|---|---|
| 0 | {2, 4, 5} |
| 1 | {2, 4, 5} |
| 2 | {2, 5} |
| 3 | {4, 5} |
| 4 | {4, 5} |
| 5 | {5} |
| 6 | {2, 4, 5} |

TABLE 8

| TDD PCell U/D configuration | Allowed reference configuration for FDD SCell (2 aggregated cells) | Allowed reference configuration for FDD SCell (more than 2 aggregated cells) |
|---|---|---|
| 0 | 5 | 2 |
| 1 | 5 | 2 |
| 2 | 5 | 2 |
| 3 | 5 | 4 |
| 4 | 5 | 4 |
| 5 | 5 | Not applicable |
| 6 | 5 | 2 |

The present invention discloses embodiments of HARQ-ACK feedback for a CA situation in a cell (or carrier) in In the present invention, a PCell may operate in a legacy licensed band and an SCell may operate in the above-described LTE-U band as an unlicensed band. A resource duration that is aperiodically secured in a UCell may be the RRP duration that has been described above. In the following embodiments, although the RRP duration refers to a DL subframe of the UCell configured in the unlicensed band, the RRP duration may indicate a DL subframe configured in the RRP duration of the UCell. In addition, the DL subframe may represent a subframe designated for usage of DL but is not limited to the above-described subframe. Although the construction of the embodiments will be described below focusing on the DL subframe, the present invention is equally applicable to a UL subframe.

As described above, when a PCell of a licensed band and an SCell of an unlicensed band are carrier-aggregated, scheduling information about a PDSCH and/or a PUSCH may be configured to be transmitted by the PCell according to CCS. The scheduling information about the PDSCH and/or the PUSCH may be configured to be transmitted by the SCell of the unlicensed band according to self-scheduling (hereinafter, SFS).

As an example, a PDSCH reception related DL control information channel in the RRP duration may be implemented in such a form that one DL control information channel schedules one PDSCH received at the same timing (i.e., single subframe scheduling (SSFS)) or that one DL control information channel schedules PDSCHs received at different timings as well as one PDSCH received at the same timing (i.e., multi-subframe scheduling (MSFS)).

Upon considering the fact that the RRP duration in the UCell is an aperiodically or discontinuously configured resource depending on a CS result, the RRP duration may be differently defined in terms of a UE operation and assumption.

For example, the RRP duration in the UCell may be a duration during which an assumption is made that a UE performs a (time/frequency) synchronization operation for the UCell or a synchronous signal (e.g., a PSS or SSS) for the synchronization operation (by an eNB) is transmitted.

Alternatively, the RRP duration may be defined as a duration during which an assumption is made that the UE performs a CSI measurement operation for the UCell or a reference signal (e.g., a CRS or a CSI-RS) for the CSI measurement operation is transmitted (by the eNB). The RRP duration may be defined as a duration during which the UE performs a data transmission/reception related DCI detection operation in the UCell. In addition, the RRP duration may be defined as a duration during which the UE performs a (temporary or temporal) buffering operation on a signal received in the UCell.

Hereinafter, the proposed methods will be described based on a 3GPP LTE system for convenience of description. However, the range of a system to which the proposed methods are applied may be extended to systems other than the 3GPP LTE system.

PUCCH format 3, PUCCH format 1B, and PUCCH format 1B with channel selection are referred to as "PF3", "PF1", and "CHSe1", respectively.

The RRP duration in the UCell may include only DL subframes. In this case, the RRP duration may be configured through a predefined signal or a preset rule.

Alternatively, a part of subframes included in the RRP duration in the UCell may be DL subframes and the other part thereof may be UL subframes.

In addition, the following proposed methods may be configured to be limitedly applied only when at least one of PF3, PF1, and CHSe1 is configured but is not limited to the above case.

Embodiments of a HARQ timing configuration method will be described hereinbelow in consideration of the above-described scheduling situation.

Embodiment 1

When a TDD PCell and a UCell operate based on CA, the UCell may be regarded as an FDD SCell. In this case, a data reception related HARQ-ACK timing in the UCell may be configured to be same as a HARQ-ACK timing of the FDD SCell when the TDD PCell and the FDD SCell operate based on CA, as described above.

That is, when the PCell and the UCell in which an RRP duration is configured based on an unlicensed scheme operate based on CA, the UCell may be configured as the FDD SCell and may operate based on the HARQ-ACK timing of the FDD SCell.

For example, in relation to the above configuration, upon considering that the UCell uses an unlicensed band and an RRP duration is configured in the UCell, an operation based on a HARQ-ACK timing in the UCell needs to be specifically defined, for implementation of a wireless communication system. For example, if a PCell is configured as the TDD PCell, the UCell may be regarded as the FDD SCell. In this case, a data reception related HARQ-ACK timing in the UCell may be configured to be the same as a HARQ-ACK timing of the FDD SCell when the TDD PCell and the FDD SCell operate based on CA.

For example, the HARQ-ACK timing of the FDD SCell in a CA situation of the TDD PCell and the FDD SCell is as described above. For the HARQ-ACK timing, reference is made to Table 9 below and, for more details, to 3GPP 36.213.

TABLE 9

FDD-TDD HARQ-ACK FEEDBACK PROCEDURES FOR PRIMARY CELL FRAME STRUCTURE TYPE 2 [1]

A UE is configured by higher layers to use either PUCCH format 1b with channel selection or PUCCH format 3 for transmission of HARQ-ACK.
    For a serving cell, if the serving cell is frame structure type 1, and a UE is not configured to monitor PDCCH/EPDCCH in another serving cell for scheduling the serving cell, set K is defined in Table 10.1.3A-1, otherwise set K is defined in Table 10.1.3.1-1.
    PUCCH format 1b with channel selection is not supported if a UE is configured with more than two serving cells, or if the DL-reference UL/DL configuration 5 (as defined in subclause 10.2) is defined for any serving cell, or if the DL-reference UL/DL configuration of a serving cell with frame structure type 1 belongs to {2, 3, 4} and the UE is not configured to monitor PDCCH/EPDCCH in another serving cell for scheduling the serving cell.
    If a UE is configured with the parameter tddModeAConfig-r12 for at least one serving cell, the UE is not expected to be configured with more than two serving cells having DL-reference UL/DL configuration 5.
    If a UE is configured to use PUCCH format 1b with channel selection for HARQ-ACK transmission, for the serving cells,
        if more than 4 HARQ-ACK bits for M multiple downlink and special subframes associated with a single UL subframe n, where M is as defined in subclause 10.1.3.2.1 for case where the UE is configured with two serving cells with different UL/DL configurations,
            spatial HARQ-ACK bundling across multiple codewords within a downlink or special subframe is performed for each serving cell by a logical AND operation of all the corresponding individual HARQ-ACKs, and the bundled HARQ-ACK bits for each serving cell is transmitted using PUCCH format 1b with channel selection,
        otherwise,
            spatial HARQ-ACK bundling is not performed, and the HARQ-ACK bits are transmitted using PUCCH format 1b with channel selection.
    If a UE is configured to use PUCCH format 3 for HARQ-ACK transmission, for the serving cells,
        if more than 21 HARQ-ACK bits for M multiple downlink and special subframes associated with a single UL subframe n, where M as defined in subclause 10.1.3.2.2 for the case of UE configured with more than one serving cell and if at least two cells have different UL/DL configurations,
            spatial HARQ-ACK bundling across multiple codewords within a downlink or special subframe is performed for each serving cell by a logical AND operation of all of the corresponding individual HARQ-ACKs, and PUCCH format 3 is used,
        otherwise,
            spatial HARQ-ACK bundling is not performed, and the HARQ-ACK bits are transmitted using PUCCH format 3.

TABLE 9-continued

FDD-TDD HARQ-ACK FEEDBACK PROCEDURES FOR PRIMARY CELL FRAME STRUCTURE TYPE 2 [1]

UE shall determine the number of HARQ-ACK bits, o, associated with an UL subframe n according to 
$$O = \sum_{c=1}^{N_{cells}^{DL}} O_c^{ACK}$$

where $N_{cells}^{DL}$ is the number of configured cells, and $O_c^{ACK}$ is the number of HARQ-bits for the c-th serving cell defined in subclause 7.3.4. If a UE is not configured to monitor PDCCH/EPDCCH in another serving cell for scheduling a serving cell with frame structure type 1, and the DL-reference UL/DL configuration of the serving cell belongs to {2, 3, 4, 5}, then the UE is not expected to be configured with $N_{cells}^{DL}$ which result in O > 21.
HARQ-ACK transmission on two antenna ports (p ∈ [p$_0$, p$_1$]) is supported for PUCCH format 3.
HARQ-ACK transmission on two antenna ports (p ∈ [p$_0$, p$_1$]) is supported for PUCCH format 1b with channel selection and with two configured serving cells.
The FDD-TDD HARQ-ACK feedback procedure for PUCCH format 1b with channel selection follows the HARQ-ACK procedure described in subclause 10.1.3.2.1 for the case of UE configured with two serving cells with different UL/DL configurations, and for PUCCH format 3 follows the HARQ-ACK procedure described in subclause 10.1.3.2.2 for the case of UE configured with more than one serving cell and if at least two cells have different UL/DL configurations.

TABLE 10.1.3.A-1

Downlink association set index K: {k$_0$,k$_1$,L k$_{M-1}$} for FDD-TDD and serving cell frame structure type 1

| DL-reference UL/DL Con- figuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

The HARQ-ACK timing of the FDD SCell may differ according to UL-DL configuration information of the TDD PCell. The UL-DL configuration information may be indicated by system information block 1 (SIB 1) but is not limited to the above-described embodiment.

In this case, a DL data reception related HARQ-ACK timing in the UCell may be configured based not only on the UL-DL configuration indicated by SIB 1 but also on additionally signaled (or predefined) information.

The DL data reception related HARQ-ACK timing in the UCell may be derived using at least one of the UL-DL configuration information indicated by SIB 1 and the additionally signaled information.

In this case, the DL data reception related HARQ-ACK timing in the UCell may be configured to be different from the UL-DL configuration information indicated by SIB 1 of the TDD PCell based on the additionally signaled information but is not limited to the above-described embodiment.

As another example, a DL subframe of the UCell may be configured at a timing corresponding to a UL subframe of the TDD PCell. As an example, the DL subframe of the UCell may mean a DL subframe in the above-described RRP duration. In this case, the DL subframe of the UCell is configured at the same timing as the UL subframe of the TDD PCell and a DL data transmission and reception related scheduling procedure (or mechanism) in the DL subframe of the UCell may not be configured.

As another example, when the DL subframe of the UCell (which may be the DL subframe in the RRP as described above) partially overlaps with the UL subframe of the TDD PCell, the DL data transmission and reception related scheduling procedure (or mechanism) may not be configured in the DL subframe of the UCell.

In this case, "the DL subframe of the UCell partially overlaps the UL subframe of the TDD PCell" may mean that the DL subframe of the UCell overlaps the UL subframe of the TDD PCell by a larger amount than a predefined or signaled allowable region. That is, the above case may be when the overlapping region exceeds a threshold value of an allowed overlapping region. The threshold value may include a predetermined error range.

As described above, when the DL data transmission and reception related scheduling procedure (or mechanism) of the UCell is not configured in the DL subframe of the UCell, the DL data reception related HARQ-ACK timing in the UCell may be configured to be the same as a HARQ-ACK timing at which the FDD SCell operates based on CCS in a CA situation of the TDD PCell and the FDD SCell.

Alternatively, when the DL data transmission and reception related scheduling procedure (or mechanism) is not configured in the DL subframe of the UCell, the DL data reception related HARQ-ACK timing in the UCell may be configured to be the same as a HARQ-ACK timing for the TDD PCell.

When the DL data transmission and reception related scheduling procedure (or mechanism) is not supported in the DL subframe, an operation similar to a CCS procedure in which the FDD SCell is scheduled by another PDCCH may be performed. In terms of use of a legacy system or improvement in stability of a wireless communication system, the DL data reception related HARQ-ACK timing in the UCell may be configured to be the same as a HARQ-ACK timing at which the FDD SCell operates based on CCS in a CA situation of the TDD PCell and the FDD SCell.

In this case, the above configuration may be interpreted as regarding the UCell as the FDD SCell. In more detail, as described above, when the HARQ-ACK timing is configured, this may be interpreted as only DL data transmission and reception related scheduling being supported only in the DL subframe of the UCell corresponding to the DL subframe of the TDD PCell (e.g., a DL subframe in the RRP).

That is, when scheduling is not supported due to overlap between the UL subframe and the DL subframe (e.g., DL subframe in the RRP) of the TDD PCell, the HARQ-ACK timing may be configured as described above.

As another example, the DL data transmission and reception related scheduling procedure (or mechanism) in the DL subframe may be supported. In this case, the HARQ-ACK timing may be configured to be the same as a HARQ-ACK timing for SFS of the FDD SCell in a CA situation of the TDD PCell and the FDD SCell.

That is, if scheduling is supported even when the UL subframe and the DL subframe (e.g., DL subframe in the RRP) of the TDD PCell overlap, the DL data transmission and reception related HARQ-ACK timing of the UCell may be configured similarly to the case in which the UCell is scheduled by a PDCCH thereof, thereby using the legacy system or improving stability of the wireless communication system.

In this case, the UCell may be interpreted as the FDD SCell.

The case in which scheduling is supported when the UL subframe and the DL subframe (e.g., DL subframe in the RRP) of the TDD PCell overlap may correspond to the case in which scheduling is supported based on DCI indicated by an MSFS scheme at a different timing. Alternatively, the case in which scheduling is supported when the UL subframe and the DL subframe (e.g., DL subframe in the RRP) of the TDD PCell overlap may correspond to the case in which scheduling is performed by the UCell according to an SFS scheme.

In addition, scheduling may be supported by applying a scheme of combining a previous timing or a predefined number of DL subframes in the RRP duration of the UCell and regarding the combined DL subframes as one virtual DL subframe.

As another example, Embodiment 1 may be limitedly applied when the UCell performs scheduling based on CCS. Alternatively, Embodiment 1 may be limitedly applied when the UCell performs scheduling based on SFS. As another example, Embodiment 1 may be configured to be limitedly applied only when all DL subframes in the RRP duration of the UCell are used for DL data reception. In this case, all DL subframes in the RRP duration may include both DL subframes in the RRP duration of the UCell at a DL subframe timing of the TDD PCell and DL subframes in the RRP duration of the UCell at a UL subframe timing of the TDD PCell.

Embodiment 2

As another example, the DL data reception related HARQ-ACK timing in the UCell may be configured to be the same as a HARQ-ACK timing of the TDD PCell. In addition, a UL data transmission related HARQ-ACK timing in the UCell may be configured to be the same as the case in which the UCell is regarded as the FDD SCell and the FDD SCell is scheduled based on SFS. That is, the UCell may be a cell operating based on SFS.

For example, when the UCell transmits UL data in an N-th subframe, the UCell may confirm whether the data has been transmitted by receiving HARQ in an (N+4)-th subframe. That is, the HARQ-ACK timing may be configured by SFS in the FDD SCell.

As another example, the UCell may be regarded as the FDD SCell and a HARQ-ACK timing configured based on CCS of the TDD PCell in a CA situation of the FDD SCell and the TDD PCell may be configured as the UL data transmission related HARQ-ACK timing in the UCell. In this case, the UCell may be a cell in which scheduling is performed based on CCS by the PCell.

In relation to the above configuration, the HARQ-ACK timing may be configured when DL data is received only in a DL subframe in an RRP duration of the UCell configured at a timing of a DL subframe of the TDD PCell. That is, the above-described HARQ-ACK timing may be configured when the DL subframe of the TDD PCell corresponds to the DL subframe in the RRP duration of the UCell but is not limited to the above embodiment.

In relation to the above configuration, the HARQ-ACK timing may be configured only when the RRP duration of the UCell configured at a timing of the DL subframe of the TDD PCell includes only DL subframes.

As another example, the DL data reception related HARQ-ACK timing in the UCell may be configured based on additionally signaled or predefined information. In this case, the signaled or predefined information may be UCell DL HARQ reference configuration information.

The UL data reception related HARQ-ACK timing may also be configured based on the additionally signaled or predefined information. In this case, the signaled or predefined information may be UCell UL HARQ reference configuration information.

Embodiment 3

A DL and/or UL HARQ-ACK timing in the UCell may be configured based on Embodiment 2. Embodiment 3 may be limitedly performed in a situation in which the HARQ-ACK timing configured in Embodiment 2 is applied. That is, the HARQ-ACK timing configured as in Embodiment 2 may be applied to the case in which the HARQ-ACK timing is limited by the following configuration. However, the following configuration may be one embodiment and Embodiment 2 may be configured independently of the following restriction and is not limited to the above embodiment.

Scheduling may be performed based on MSFS in the UCell. That is, as described above, a PDSCH reception related DL control information channel in the RRP may perform scheduling for not only one PDSCH received at the same timing as one DL control information channel but also a PDSCH received at a different timing. Information about the PDSCH received at a different timing may be acquired by predefined or signaled information but is not limited to the above-described embodiments.

In this case, the range within which MSFS of MSFS DL grant DCI can be performed may be limited to DL subframes in a DL HARQ timeline based bundling window of a TDD PCell to which the MSFS DL grant DCI belongs.

The bundling window may be DL subframes corresponding to HARQ-ACK information transmitted at one specific UL subframe timing. In this case, the DL subframes may be contiguous or discontinuous but are not limited to the above embodiment.

That is, the range within which MSFS can be performed may be limited to DL subframes corresponding to HARQ-ACK information transmitted at one specific UL subframe timing in the TDD PCell.

In addition, a HARQ-ACK timing for SFS of the FDD SCell in a CA situation of the TDD PCell and the FDD SCell may be applied to the UCell. In this case, the MSFS DL grant DCI may be limited to DL subframes included in a bundling window configured by a HARQ-ACK timeline of a subframe to which the MSFS DL grant DCI belongs based on SFS.

For example, the above-described DL subframes may mean DL subframes configured in the RRP duration of the UCell. A HARQ-ACK operation may be performed based on bundling (i.e., A/N codebook size reduction may be performed) in the time domain with respect to HARQ-ACK in the unit of the range within which MSFS can be performed but is not limited to the above embodiment.

When MSFS is applied, an ACK resource indicator (ARI) field may be configured or defined in the MSFS DL grant DCI. In this case, the ARI field may be a field indicating a resource for ACK information. For example, the ARI field may re-use a legacy field included in the DL grant DCI. In this case, the legacy field included in the DL grant DCI may be a TPC field. The ARI field may be a newly defined field to indicate the resource for the ACK information but is not limited to the above embodiment.

In addition, when MSFS is applied and a channel selection scheme is applied, the ARI field may be defined in the DL grant DCI. One of a plurality of resources presignaled or predefined through the ARI field may be designated as a resource for CHSe1 but is not limited to the above-described embodiments.

More specifically, the MSFS DL grant DCI may be received in an N-th subframe of the TDD PCell. The MSFS DL grant DCI may include scheduling information about two subframes in the RRP of the UCell. The two subframes are purely exemplary and may include scheduling information about more subframes. In this case, scheduling information about an N-th subframe and an (N+1)-th subframe as subframes in the RRP of the UCell may be included in the MSFS DL grant DCI.

A DL data related PUCCH resource received in an N-th subframe of the UCell may be allocated as an implicit PUCCH resource linked with the MSFS DL grant DCI. That is, the DL data related PUCCH resource may be a PUCCH resource configured based on a lowest CCE index constituting a PDCCH or an EPDCCH of an N-th subframe of the TDD PCell. That is, the PUCCH resource may be identically indicated as in a legacy system. A DL data related PUCCH resource received in an (N+1)-th subframe in the RRP of the UCell may be configured as one PUCCH resource indicated by the ARI field of the MSFS DL grant DCI. As described above, the MSFS DL grant DCI may be information included in the N-th subframe of the PCell. That is, a PUCCH resource that is implicitly indicated through the CCE index is identically configured as in the legacy system and a PUCCH resource for another subframe based on MSFS may be separately indicated through the ARI field.

As an example, Embodiment 3 may be applied only under a specific condition. As an example, Embodiment 3 may be limitedly applied when the UCell is scheduled by the PCell according to CCS.

Alternatively, Embodiment 3 may be limitedly applied only when the UCell is scheduled according to SFS.

As another example, Embodiment 3 may be limitedly applied only when only a DL subframe in the RRP of the UCell is used for DL data reception at a DL subframe timing of the TDD PCell or only when the RRP is configured as only DL subframes but is not limited to the above embodiment.

The MSFS DL grant DCI may be configured to be decoded based on a new RNTI as a signaled or predefined RNTI. In this case, the RNTI may be an MSFS-RNTI that is different from a C-RNTI of a legacy system.

Embodiment 4

As described above, the RRP may be configured in the UCell. In this case, a plurality of HARQ-ACK information corresponding to DL subframes in the RRP may be aggregated and then transmitted through one UL subframe (hereinafter, this operation is referred to as AGG_A/N). Aggregated DL subframes in the RRP may be configured as all DL subframes included in the RRP. Alternatively, the aggregated DL subframes in the RRP may be configured as partial DL subframes included in the RRP. Information about the aggregated DL subframes may be signaled or predefined but is not limited to the above embodiment.

The aggregated HARQ-ACK information may be simultaneously transmitted through one UL subframe.

Aggregation may be performed on a plurality of HARQ-ACK information corresponding to a plurality of DL subframes. Various aggregation methods may be used and is not limited to a specific method.

The above-described AGG_A/N operation may be limitedly permitted only when feedback is performed based on PUCCH format 3. That is, the AGG_A/N operation may be configured to be limitedly performed only when feedback is performed based on PUCCH format 3 in consideration of a situation in which a resource size is limited since a plurality of HARQ-ACK information is aggregated information.

If the RRP is configured as fewer subframes in number than a predefined threshold value, a channel selection based AGG_A/N operation may be permitted. That is, if few subframes are configured in the RRP in consideration of an allocated resource, feedback may be performed based on CHSe1. The threshold value may be set to 5 but is not limited thereto.

For example, if a time-domain bundling scheme is applied to DL subframes included in the RRP, the channel selection based AGG_A/N operation may be permitted. That is, if fewer subframes are designated to the RRP, feedback may be performed based on CHSe1.

When the AGG_A/N operation is applied, ARI fields of data scheduling related DL grant DCI for DL subframes belonging to the same RRP may be set to the same value. That is, in consideration of a situation in which HARQ-ACK information about DL subframes belonging to the RRP is aggregated and transmitted in one UL subframe, the ARI field values of the DL grant DCI may be set to the same value.

In this case, HARQ-ACK information corresponding to DL subframes included in the RRP of the UCell may be arranged in a time or index order of the subframes but is not limited to the above embodiment.

In addition, when the AGG_A/N operation is applied, DL data scheduling in the UCell may be performed based on MSFS. In this case, the range of subframes capable of performing scheduling in one MSFS DL grant DCI may be configured within the above AGG_A/N operation based bundling window. That is, the range may be limited to a range of DL subframes corresponding to HARQ-ACK information transmitted at one specific UL subframe timing.

For example, the DL subframes may be DL subframes in the RRP of the UCell.

In addition, the DL subframes may be configured based on HARQ-ACK time-domain bundling (i.e., A/N codebook size reduction may be performed) in the unit of the range within which MSFS can be performed.

As another example, when MSFS is applied under an AGG_A/N operation, an ARI field may be configured or defined in MSFS DL grant DCI. The ARI field may indicate a resource for ACK information. The ARI field may reuse a legacy field included in the DL grant DCI. For example, the legacy field included in the DL grant DCI may be a TPC field. The ARI field may be a newly defined field for indicating the resource for the ACK information but is not limited to the above embodiment.

When MSFS is applied and a channel selection scheme is applied, the ARI field may be defined in the DL grant DCI. In this case, one of a plurality of presignaled or predefined resources may be designated as a resource for CHSel through the ARI field but is not limited to the above embodiment.

Embodiment 4 may be applied under a specific condition. For example, Embodiment 4 may be limited applied when the UCell is scheduled by CCS from a PCell.

Alternatively, Embodiment 4 may be limitedly applied only when the UCell is scheduled by SFS.

As another example, Embodiment 4 may be limitedly applied when only a DL subframe in the RRP of the UCell is used for DL data reception at a DL subframe timing of the TDD PCell or when the RRP is configured as only DL subframes but is not limited to the above embodiment.

The MSFS DL grant DCI may be decoded based on a new RNTI as a signaled or predefined RNTI. For example, the RNTI may be an MSFS-RNTI that is different from a C-RNTI of a legacy system.

Embodiment 5

DL data scheduling in a DL subframe in the RRP of the UCell may be configured based on CCS from a predefined scheduling cell (SgCell). In this case, DCI transmitted in an N-th DL subframe of the SgCell may schedule one transport block (TB) transmitted in a K-th DL subframe and (K+1)-th DL subframe in the RRP of the UCell. That is, one TB may be transmitted in a plurality of DL subframes included in the RRP of the UCell. In this case, a PUCCH resource corresponding to the TB transmitted in the plural DL subframes may be allocated as a signaled or predefined resource. Information about the PUCCH resource may be configured through RRC signaling. The PUCCH resource may be implicitly configured in linkage with DCI transmitted in the N-th DL subframe of the SgCell. That is, the PUCCH resource may be allocated or configured as a PUCCH resource linked with a lowest CCE index constituting a PDCCH or an EPDCCH.

If one TB is transmitted in a plurality of DL subframes in the RRP of the UCell and CCS is performed by the SgCell, the PUCCH resource corresponding to the RB may be configured to be linked based on the PDCCH or EPDCCH of the SgCell.

The SgCell may be a signaled or predefined PCell. Alternatively, the SgCell may be a licensed cell (LCell) or a UCell but is not limited to the above embodiment.

As described above, when one TB is transmitted in two DL subframes, the K-th DL subframe and the (K+1)-th DL subframe of the UCell may be one virtual DL subframe. That is, the K-th DL subframe and the (K+1)-th DL subframe of the UCell may be regarded as one subframe and then an operation may be performed.

The K-th DL subframe of the UCell may be a subframe corresponding to a DL subframe of the UCell corresponding to an N-th DL subframe timing of the SgCell. For example, the K-th DL subframe of the UCell may a DL subframe of the UCell partially overlapping with the N-th DL subframe of the SgCell. The K-th DL subframe of the UCell may be limited to the case in which the N-th DL subframe of the SgCell and the DL subframe of the UCell overlap with each other by a larger amount than a signaled or predefined threshold value. The K-th DL subframe of the UCell may be a DL subframe of the UCell having the same subframe index as the N-th subframe of the SgCell. That is, the N-th subframe of the UCell may be the K-th DL subframe.

For example, the K-th DL subframe of the UCell may include fewer OFDM symbols in number than OFDM symbols of a normal DL subframe.

That is, the K-th DL subframe of the UCell may include few OFDM symbols and may be configured to constitute one TB together with the (K+1)-th DL subframe. The number of OFDM symbols is not limited to the above embodiment.

The K-th DL subframe of the UCell may be configured as a subframe having fewer OFDM symbols based on a result of clear channel assessment (CCA) of the UCell, as described above.

The (K+1)-th DL subframe of the UCell may be a DL subframe in the RRP of the UCell corresponding to a UL subframe timing of the TDD SgCell. For example, the (K+1)-th DL subframe of the UCell may be a DL subframe in the RRP of the UCell partially overlapping with a UL subframe timing of the TDD SgCell. Alternatively, the (K+1)-th DL subframe of the UCell may be a DL subframe in the RRP of the UCell overlapping with the UL subframe of the TDD SgCell by a larger amount than a signaled or predefined allowed region. The (K+1)-th DL subframe of the UCell may be a DL subframe in the RRP of the UCell having the same subframe index as the UL subframe of the TDD SgCell. That is, the (K+1)-th DL subframe of the UCell that transmits a TB by overlapping with the K-th DL subframe of the UCell and feeds back PUCCH information based on the K-th DL subframe may be a subframe corresponding to the UL subframe of the TDD SgCell but is not limited to the above embodiment.

For a HARQ-ACK timing, reference is made to Table 10 below and, for more derails thereof, to 3GPP 36.213.

TABLE 10

HARQ-ACK transmission on two antenna ports (p ∈ [p$_0$, p$_1$]) is supported for PUCCH format 1a/1b with TDD HARQ-ACK bundling feedback mode and for PUCCH format 3.
A UE that supports aggregating more than one serving cell with frame structure type 2 can be configured by higher layers for HARQ-ACK transmission on two antenna ports (p ∈ [p$_0$, p$_1$]) for PUCCH format 1b with channel selection.
The TDD HARQ-ACK procedure for a UE configured with PUCCH format 3 is as described in subclause 10.1.3.2.2 when the UE receives PDSCH and/or SPS release PDCCH/EPDCCH only on the primary cell.

TABLE 10-continued

If the UE is not configured with the higher layer parameter EIMTA-MainConfigServCell-r12, for TDD HARQ-ACK bundling or TDD HARQ-ACK multiplexing for one configured serving cell and a subframe n with M = 1 where M is the number of elements in the set K defined in Table 10.1.3.1-1, the UE shall use PUCCH resource $n_{PUCCH}^{(1,\tilde{p})}$ for transmission of HARQ-ACK in subframe n for $\tilde{p}$ mapped to antenna port p for PUCCH format 1a/1b, where If there is PDSCH transmission indicated by the detection of corresponding PDCCH/EPDCCH or there is PDCCH/EPDCCH indicating downlink SPS release within subframe(s) n − k, where k ∈ K and K (defined in Table 10.1.3.1-1) is a set of M elements $\{k_0, k_1, L\ k_{M-1}\}$ depending on the subframe n and the UL/DL configuration (defined in Table 4.2-2 in [3]), and if PDCCH indicating PDSCH transmission or downlink SPS release is detected in subframe n − $k_m$, where $k_m$ is the smallest value in set K such that UE detects a PDCCH/EPDCCH indicating PDSCH transmission or downlink SPS release within subframe(s) n − k and k ∈ K, the UE first selects a c value out of {0, 1, 2, 3} which makes $N_c \le n_{CCE} < N_{c+1}$ and shall use $n_{PUCCH}^{(1,\tilde{p}_0)} = (M - m - 1) \cdot N_c + m \cdot N_{c+1} + n_{CCE} + N_{PUCCH}^{(1)}$ for antenna port $p_0$, where $N_{PUCCH}^{(1)}$ is configured by higher layers, $N_c = \max\{0, \lfloor[N_{RB}^{DL} \cdot (N_{sc}^{RB} \cdot c - 4)]/36\rfloor\}$, and $n_{CCE}$ is the number of the first CCE used for transmission of the corresponding PDCCH in subframe n − $k_m$ and the corresponding m. When two antenna port transmission is configured for PUCCH format 1a/1b, the PUCCH resource for HARQ-ACK bundling for antenna port $p_1$ is given by $n_{PUCCH}^{(1,\tilde{p}_1)} = (M - m - 1) \cdot N_c + m \cdot N_{c+1} + n_{CCE} + 1 + N_{PUCCH}^{(1)}$.

If there is only a PDSCH transmission where there is not a corresponding PDCCH/EPDCCH detected within subframe(s) n − k, where k ∈ K and K is defined in Table 10.1.3.1-1, the UE shall use PUCCH format 1a/1b and PUCCH resource $n_{PUCCH}^{(1,\tilde{p})}$ with the value of $n_{PUCCH}^{(1,\tilde{p})}$ is determined according to higher layer configuration and Table 9.2-2. For a UE configured for two antenna port transmission for PUCCH format 1a/1b and HARQ-ACK bundling, a PUCCH resource value in Table 9.2-2 maps to two PUCCH resources with the first PUCCH resource $n_{PUCCH}^{(1,\tilde{p}_0)}$ for antenna port $p_0$ and the second PUCCH resource $n_{PUCCH}^{(1,\tilde{p}_1)}$ for antenna port $p_1$, otherwise, the PUCCH resource value maps to a single PUCCH resource $n_{PUCCH}^{(1,\tilde{p}_0)}$ for antenna port $p_0$.

If there is PDSCH transmission indicated by the detection of corresponding PDCCH/EPDCCH or there is PDCCH/EPDCCH indicating downlink SPS release within subframe(s) n − k, where k ∈ K and K (defined in Table 10.1.3.1-1) is a set of M elements $\{k_0, k_1, L\ k_{M-1}\}$ depending on the subframe n and the UL/DL configuration (defined in Table 4.2-2 in [3]), and if EPDCCH indicating PDSCH transmission or downlink SPS release is detected in subframe n − $k_m$, where $k_m$ is the smallest value in set K such that UE detects a PDCCH/EPDCCH indicating PDSCH transmission or downlink SPS release within subframe(s) n − k and k ∈ K, the UE shall use if EPDCCH-PRB-set q is configured for distributed transmission $$n_{PUCCH}^{(1,\tilde{p}_0)} = n_{ECCE,q} + \sum_{i1=0}^{m-1} N_{ECCE,q,n-k_{i1}} + \Delta_{ARO} + N_{PUCCH,q}^{(e1)}$$

if EPDCCH-PRB-set q is configured for localized transmission $$n_{PUCCH}^{(1,\tilde{p}_0)} = \left\lfloor \frac{n_{ECCE,q}}{N_{RB}^{ECCE,q}} \right\rfloor \cdot N_{RB}^{ECCE,q} + \sum_{i1=0}^{m-1} N_{ECCE,q,n-k_{i1}} + n' + \Delta_{ARO} + N_{PUCCH,q}^{(e1)}$$

for antenna port $p_0$, where $n_{ECCE,q}$ is the number of the first ECCE (i.e. lowest ECCE index used to construct the EPDCCH) used for transmission of the corresponding DCI assignment in EPDCCH-PRB-set q in subframe n − $k_m$ and the corresponding m, $N_{PUCCH,q}^{(e1)}$ for EPDCCH-PRB-set q is configured by the higher layer parameter pucch-ResourceStartOffset-r11, $N_{RB}^{ECCE,q}$ for EPDCCH-PRB-set q in subframe n − $k_m$ is given in subclause 6.8A.1 in [3], n' is determined from the antenna port used for EPDCCH transmission in subframe n − $k_m$ which is described in subclause 6.8A.5 in [3]. If m = 0, $\Delta_{ARO}$ is determined from the HARQ-ACK resource offset field in the DCI format of the corresponding EPDCCH as given in Table 10.1.2.1-1. If m > 0, $\Delta_{ARO}$ is determined from the HARQ-ACK resource offset field in the DCI format of the corresponding EPDCCH as given in Table 10.1.3.1-2. If the UE is configured to monitor EPDCCH in subframe n − $k_{i1}$, $N_{ECCE,q,n-k_{i1}}$ is equal to the number of ECCEs in EPDCCH-PRB-set q configured for that UE in subframen n − $k_{i1}$. If the UE is not configured to monitor EPDCCH in subframe n − $k_{i1}$, $N_{ECCE,q,n-k_{i1}}$ is equal to the number of ECCEs computed assuming EPDCCH-PRB-set q is configured for that UE in subframe n − $k_{i1}$. For normal downlink CP, if subframe n − $k_{i1}$ is a special subframe with special subframe configuration 0 or 5, $N_{ECCE,q,n-k_{i1}}$ is equal to 0. For extended downlink CP, if subframe n − $k_{i1}$ is a special subframe with special subframe configuration 0 or 4 or 7, $N_{ECCE,q,n-k_{i1}}$ is equal to 0. When two antenna port transmission is configured for PUCCH format 1a/1b, the PUCCH resource for HARQ-ACK bundling for antenna port $p_1$ is given by if EPDCCH-PRB-set q is configured for distributed transmission $$n_{PUCCH}^{(1,\tilde{p}_1)} = n_{ECCE,q} + 1 + \sum_{i1=0}^{m-1} N_{ECCE,q,n-k_{i1}} + \Delta_{ARO} + N_{PUCCH,q}^{(e1)}$$

TABLE 10-continued if EPDCCH-PRB-set q is configured for localized transmission $$n_{PUCCH}^{(1,\tilde{p}_1)} = \left\lfloor \frac{n_{ECCE,q}}{N_{RB}^{ECCE,q}} \right\rfloor \cdot N_{RB}^{ECCE,q} + 1 + \sum_{i1=0}^{m-1} N_{ECCE,q,n-k_{i1}} + n' + \Delta_{ARO} + N_{PUCCH,q}^{(e1)}$$

TABLE 10.1.3.1-1

Downlink association set K: {$k_0,k_1,L\ k_{M-1}$} for TDD

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Embodiment 6

DL data scheduling in a DL subframe in the UCell RRP may be performed based on CCS and MSFS from a TDD PCell (i.e., SgCell).

The number and locations of DL subframes in the UCell RRP that one MSFS DCI schedules may be predetermined. For example, the number and locations of DL subframes in the UCell RRP may be configured based on TDD UL-DL configuration information.

A HARQ-ACK timing of the TDD PCell may be configured based on the TDD UL-DL configuration information. For example, the HARQ-ACK timing of the TDD PCell may be configured by additionally signaled or preset TDD UL-DL configuration (i.e., "ADD_REFER_UDCONFIG").

As described above, the HARQ-ACK timing for DL data received in a DL subframe in the UCell RRP that the MSFS DCI schedules may be configured based on TDD UL-DL configuration information. As an example, the HARQ-ACK timing of the TDD PCell may be configured by the additionally signaled or preset TDD UL-DL Configuration (i.e., "ADD_REFER_UDCONFIG").

A DL subframe in the UCell RRP in which HARQ-ACK transmission for DL data reception is supported based on the above-described HARQ-ACK timing may be a legacy DL subframe (LgDSF). A DL subframe in the UCell RRP in which HARQ-ACK transmission for DL data reception is not supported based on the above-described HARQ-ACK timing may be an additional downlink subframe (AdDSF). HARQ-ACK transmission based on a legacy HARQ-ACK timing is not supported in the AdDSF and needs to be additionally defined.

DL data scheduling in a specific AdDSF may be configured based on CCS and MSFS in a DL subframe of the TDD PCell corresponding to an LgDSF that does not include a corresponding timing the specific AdDSF and is nearest a previous timing of the corresponding timing.

For example, DL data scheduling in a specific AdDSF may be configured based on CCS and MSFS in a DL subframe of the TDD PCell partially overlapping with the LgDSF timing. In addition, DL data scheduling in a specific AdDSF may be configured based on CCS and MSFS in a DL subframe of the TDD PCell overlapping with the LgDSF timing by a larger amount than a predefined or signaled threshold value. In addition, DL data scheduling in a specific AdDSF may be configured based on CCS and MSFS in a DL subframe of the TDD PCell having the same index as the LgDSF timing. That is, DL data scheduling for the AdDSF may be configured based on CCS and MSFS in a DL subframe of the TDD PCell corresponding to a nearest LgDSF as a previous timing.

The numbers and locations of AdDSFs and LgDSFs in the UCell RRP that one specific MSFS DCI schedules based on TDD UL-DL configuration may be preset.

A PUCCH resource corresponding to DL data of the AdDSF and LgDSF in the UCell RRP that the MSFS DCI schedules may be implicitly allocated and configured based on the lowest CCE index of an MSFS DCI transmission related PDCCH or EPDCCH. Alternatively, a signaled (e.g., RRC) or predefined explicit PUCCH resource may be allocated and configured.

In association with the above-described embodiment, DL data scheduling in a DL subframe in the UCell RRP may be configured based on CCS and MSFS and a DL data reception related HARQ-ACK timing in the UCell may be limitedly applied only when the timing is configured to be the same as a HARQ-ACK timing for SFS of an FDD SCell in a CA situation of the TDD PCell and the FDD SCell.

DL data scheduling in the above-described LgDSF may be configured based on CCS in a DL subframe of the TDD PCell corresponding to a corresponding timing the LgDSF. DL data scheduling in the LgDSF may be distinguished by independent DCI other than MSFS DCI.

A plurality of PUCCH resources corresponding to the LgDSF and the AdDSF that one MSFS DCI schedules may be allocated and configured as two PUCCH resources linked to a lowest CCE index and a lowest CCE index+1 of the MSFS DCI transmission related PDCCH or EPDCCH.

Alternatively, a plurality of PUCCH resources corresponding to the LgDSF and the AdDSF that one MSFS DCI schedules may be allocated and configured as a PUCCH resource linked to the lowest CCE index of the MSFS DCI transmission related PDCCH or EPDCCH and a presignaled (e.g., RRC) or predefined explicit PUCCH resource.

In relation to the above configuration, a scheduling rule will be described below based on UL-DL configuration of the TDD PCell.

Figure 13:
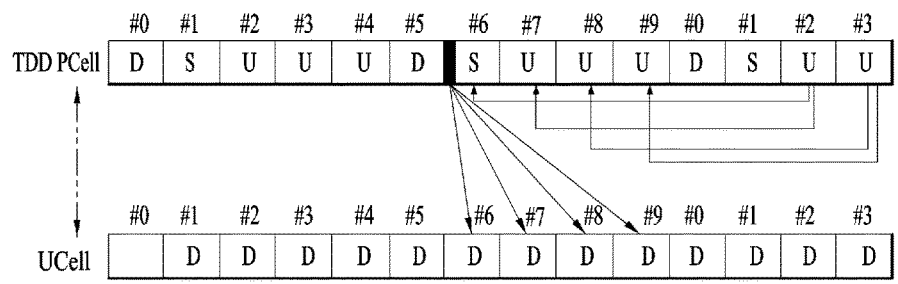
FIG. 13 is a diagram illustrating an example of performing scheduling based on UL-DL configuration.

FIG. 13 is a diagram illustrating an example of performing scheduling based on UL-DL configuration.

Embodiment 6-1

UL-DL configuration of the TDD PCell may be set to 0. FIG. 13 illustrates UL-DL configuration set to 0. Embodiments 6-2 to 6-7 described below may be operated in the same manner as in Embodiment 6-1 and FIG. 13.

DL data scheduling in AdDSFs and LgDSFs in a UCell RRP corresponding to subframe 2-K1 and subframe 3-K2 of the TDD PCell may be performed through one MSFS DCI received in subframe 2-K3 of the TDD PCell. In this case, K1 may be 6 or 5, K2 may be 5 or 4, and K3 may be 6.

That is, as illustrated in FIG. 13, scheduling for subframes #6, #7, #8, and #9 in the UCell RRP may be performed through MSFS DCI of the subframe #6 of the TDD PCell.

As another example, DL data scheduling in LgDSFs corresponding to subframe 2-K1 (i.e., 'K1=6') of the TDD PCell may be performed through UCell related independent DCI rather than the MSFS DCI received in subframe 2-K3 (i.e., 'K3=6') of the TDD PCell.

That is, one MSFS DCI received in subframe 2-K3 (i.e., 'K3=6') of the TDD PCell may indicate DL data scheduling in AdDSFs in the UCell RRP corresponding to subframe 2-K1 (i.e., 'K1=5') of the TDD PCell and subframe 3-K2 (i.e., 'K2=5 or 4') of the TDD PCell and scheduling of subframe 2-K3 (i.e., 'K3=6') of the TDD PCell in the LgDSF may be performed through independent DCI rather than the above-described MSFS DCI.

As another example, DL data scheduling in AdDSFs and LgDSFs in the UCell RRP corresponding to subframe 7-K1 (i.e., 'K1=6 or 5') and subframe 8-K2 (i.e., 'K2=5 or 4') of the TDD PCell may be performed through one MSFS DCI received in subframe 7-K3 (i.e., 'K3=6') of the TDD PCell.

In addition, DL data scheduling in the LgDSF in the UCell RRP corresponding to subframe 7-K1 (i.e., 'K1=6') of the TDD PCell may be performed through independent DCI related to the UCell rather than the MSFS DCI received in subframe 7-K3 (i.e., 'K3=6') of the TDD PCell.

One MSFS DCI received in subframe 7-K3 (i.e., 'K3=6') of the TDD PCell may indicate DL data scheduling in AdDSFs in the UCell RRP corresponding to subframe 7-K1 (i.e., 'K1=5') and subframe 8-K2 (i.e., 'K2=5 or 4') of the TDD PCell.

The above-described embodiment is illustrated in FIG. 13 and the following methods may be identically applied as in FIG. 13. Notably, each of the following embodiments may be differently configured based on UL-DL configuration of the TDD PCell.

Embodiment 6-2

UL-DL configuration of the TDD PCell may be set to 1.

As an example, DL data scheduling in AdDSFs and LgDSFs in a UCell RRP corresponding to subframe 2-K1 (i.e., 'K1=(6)') and subframe 3-K2 (i.e., 'K2=6 or 5') of the TDD PCell may be configured to be performed through one MSFS DCI received in subframe 2-K3 (i.e., 'K3=6') of the TDD PCell.

As an example, DL data scheduling in LgDSFs in the UCell RRP corresponding to subframe 2-K1 (i.e., 'K1=6') of the TDD PCell may be configured to be performed through UCell related independent DCI rather than the MSFS DCI received in subframe 2-K3 (i.e., 'K3=6') of the TDD PCell.

In relation to the above configuration, one MSFS DCI received in subframe 2-K3 (i.e., 'K3=6') of the TDD PCell may indicate DL data scheduling in AdDSFs in the UCell RRP corresponding to subframe 3-K2 (i.e., 'K2=6 or 5') of the TDD PCell.

As another example identical to the above configuration, DL data scheduling in AdDSFs and LgDSFs in the UCell RRP corresponding to subframe 7-K1 (i.e., 'K1=(6)') and subframe 8-K2 (i.e., 'K2=6 or 5') of the TDD PCell may be configured to be performed through one MSFS DCI received in subframe 7-K3 (i.e., 'K3=6') of the TDD PCell. For example, a rule may be defined such that DL data scheduling in LgDSFs in the UCell RRP corresponding to subframe 7-K1 (i.e., 'K1=6') of the TDD PCell is performed through UCell related independent DCI rather than MSFS DCI received in subframe 7-K3 (i.e., 'K3=6') of the TDD PCell, as described above.

In relation to the above configuration, one MSFS DCI received in subframe 7-K3 (i.e., 'K3=6') of the TDD PCell may indicate DL data scheduling in AdDSFs in the UCell RRP corresponding to subframe 8-K2 (i.e., 'K2=6 or 5') of the TDD PCell.

Embodiment 6-3

UL-DL configuration of the TDD PCell may be set to 2.

In this case, as an example, DL data scheduling in AdDSFs and LgDSFs in the UCell RRP corresponding to subframe 2-K1 (i.e., 'K1=(6) or 5') of the TDD PCell may be configured to be performed through one MSFS DCI received in subframe 2-K3 (i.e., 'K3=6') of the TDD PCell.

As an example, DL data scheduling in LgDSFs in the UCell RRP corresponding to subframe 2-K1 (i.e., 'K1=6') of the TDD PCell may be configured to be performed through UCell related independent DCI rather than the MSFS DCI received in subframe 2-K3 (i.e., 'K3=6') of the TDD PCell.

In relation to the above configuration, the MSFS DCI received in subframe 2-K3 (i.e., 'K3=6') of the TDD PCell may indicate DL data scheduling in AdDSFs in the UCell RRP corresponding to subframe 2-K2 (i.e., 'K2=5') of the TDD PCell.

As another example related to the above configuration, DL data scheduling in AdDSFs and LgDSFs in the UCell RRP corresponding to subframe 7-K1 (i.e., 'K1=(6) or 5') of the TDD PCell may be configured to be performed through the MSFS DCI received in subframe 7-K3 (i.e., 'K3=6') of the TDD PCell. For example, DL data scheduling in LgDSFs in the UCell RRP corresponding to subframe 7-K1 (i.e., 'K1=6') of the TDD PCell may be configured to be performed through UCell related independent DCI rather than the MSFS DCI received in subframe 7-K3 (i.e., 'K3=6') of the TDD PCell.

In relation to the above configuration, the MSFS DCI received in subframe 7-K3 (i.e., 'K3=6') of the TDD PCell may indicate DL data scheduling in AdDSFs in the UCell RRP corresponding to subframe 7-K2 (i.e., 'K2=5') of the TDD PCell.

Embodiment 6-4

UL-DL configuration of the TDD PCell may be set to 3. In this case, as an example, DL data scheduling in AdDSFs and LgDSFs in the UCell RRP corresponding to subframe 2-K1 (i.e., 'K1=(11), 10, 9, or 8') of the TDD PCell may be configured to be performed through the MSFS DCI received in subframe 2-K3 (i.e., 'K3=11') of the TDD PCell.

As an example, DL data scheduling in LgDSFs in the UCell RRP corresponding to subframe 2-K1 (i.e., 'K1=11') of the TDD PCell may be configured to be performed through UCell related independent DCI rather than the MSFS DCI received in subframe 2-K3 (i.e., 'K3=11') of the TDD PCell.

In relation to the above configuration, the MSFS DCI received in subframe 2-K3 (i.e., 'K3=11') of the TDD PCell may indicate DL data scheduling in AdDSFs in the UCell RRP corresponding to subframe 2-K1 (i.e., 'K1=10, 9, or 8') of the TDD PCell.

Embodiment 6-5

UL-DL configuration of the TDD PCell may be set to 4. In this case, as an example, DL data scheduling in AdDSFs and LgDSFs in the UCell RRP corresponding to subframe 2-K1 (i.e., 'K1=(11), 10, or 9') of the TDD PCell may be configured to be performed through the MSFS DCI received in subframe 2-K3 (i.e., 'K3=11') of the TDD PCell.

As an example, a rule may be defined such that DL data scheduling in LgDSFs in the UCell RRP corresponding to subframe 2-K1 (i.e., 'K1=11') of the TDD PCell may be performed through UCell related independent DCI rather than the MSFS DCI received in subframe 2-K3 (i.e., 'K3=11') of the TDD PCell.

In relation to the above configuration, the MSFS DCI received in subframe 2-K3 (i.e., 'K3=11') of the TDD PCell may indicate DL data scheduling in AdDSFs in the UCell RRP corresponding to subframe 2-K1 (i.e., 'K1=10 or 9') of the TDD PCell.

Embodiment 6-6

UL-DL configuration of the TDD PCell may be set to 5. In this case, as an example, DL data scheduling in AdDSFs and LgDSFs in the UCell RRP corresponding to subframe 2-K1 (i.e., 'K1=(11) or 10') of the TDD PCell may be configured to be performed through the MSFS DCI received in subframe 2-K3 (i.e., 'K3=11') of the TDD PCell.

As an example, DL data scheduling in LgDSFs in the UCell RRP corresponding to subframe 2-K1 (i.e., 'K1=11') of the TDD PCell may be configured to be performed through UCell related independent DCI rather than the MSFS DCI received in subframe 2-K3 (i.e., 'K3=11') of the TDD PCell.

As another example, the MSFS DCI received in subframe 2-K3 (i.e., 'K3=11') of the TDD PCell may indicate DL data scheduling in AdDSFs in the UCell RRP corresponding to subframe 2-K1 (i.e., 'K1=10') of the TDD PCell.

Embodiment 6-7

UL-DL configuration of the TDD PCell may be set to 6. In this case, as an example, DL data scheduling in AdDSFs in the UCell RRP corresponding to subframe 2-K1 (i.e., 'K1=8') of the TDD PCell may be configured to be performed through the MSFS DCI received in subframe 2-K3 (i.e., 'K3=11') of the TDD PCell.

As an example, for DL data scheduling in AdDSFs and LgDSFs in the UCell RRP corresponding to subframe 8-K1 (i.e., 'K1=(17), 16, or 15') of the TDD PCell, the MSFS DCI transmitted in subframe 8-K3 (i.e., 'K3=17') of the TDD PCell may be configured to perform DL data scheduling in AdDSFs and LgDSFs in the UCell RRP corresponding to subframe 8-K1 (i.e., 'K1=(17), 16, or 15') of the TDD PCell and subframe 2-K1 (i.e., 'K1=8') of the TDD PCell or may be independently configured.

As an example, DL data scheduling in AdDSFs and LgDSFs in the UCell RRP corresponding to subframe 3-K1 (i.e., 'K1=(7) or 6') and subframe 4-K2 (i.e., 'K2=6') of the TDD PCell may be configured to be performed through the MSFS DCI received in subframe 3-K3 (i.e., 'K3=7') of the TDD As an example, DL data scheduling in LgDSFs in the UCell RRP corresponding to subframe 3-K1 (i.e., 'K1=7') of the TDD PCell may be configured to be performed through UCell related independent DCI rather than the MSFS DCI received in subframe 3-K3 (i.e., 'K3=7') of the TDD PCell.

As another example, the MSFS DCI received in subframe 3-K3 (i.e., 'K3=7') of the TDD PCell may indicate DL data scheduling in AdDSFs in the UCell RRP corresponding to subframe 3-K1 (i.e., 'K1=6') and subframe 4-K2 (i.e., 'K2=6') of the TDD PCell.

As an example, DL data scheduling in AdDSFs and LgDSFs in the UCell RRP corresponding to subframe 8-K1 (i.e., 'K1=(7), 6, or 5') of the TDD PCell may be configured to be performed through the MSFS DCI received in subframe 8-K3 (i.e., 'K3=7') of the TDD PCell.

As an example, DL data scheduling in an LgDSF in the UCell RRP corresponding to subframe 8-K1 (i.e., 'K1=7') of the TDD PCell may be configured to be performed through UCell related independent DCI rather than the MSFS DCI received in subframe 8-K3 (i.e., 'K3=7') of the TDD PCell.

As an example, the MSFS DCI received in subframe 8-K3 (i.e., 'K3=7') of the TDD PCell may indicate DL data scheduling in AdDSFs in the UCell RRP corresponding to subframe 8-K1 (i.e., 'K1=6 or 5') of the TDD PCell.

The above embodiments may be applied when DL data scheduling in a DL subframe in the UCell RRP performs CCS and MSFS from the TDD PCell.

The above embodiments may be limitedly applied only when a DL data reception related HARQ-ACK timing in the UCell conforms to a HARQ-ACK timing based on SFS of the FDD SCell in a CA situation of the TDD PCell and the FDD SCell.

Embodiment 7

In a situation of the TDD PCell, according to the above embodiments, DL scheduling in DL subframes in the UCell RRP is performed based on MSFS and, if A/N time bundling or spatial bundling is applied, a plurality of DL subframes in a UCell RRP that MSFS DCI schedules may be configured as one DL subframe.

In relation to the above configuration, if a final A/N payload size transmitted at a specific UL subframe timing and a table for channel selection are determined based on one DL subframe rather than an actual number of DL subframe in the UCell RRP that the MSFS DCI schedules. As an example, PUCCH resources corresponding to a plurality of DL subframes in the UCell RRP that the MSFS DCI schedules may be configured in linkage with the lowest CCE index of a PDCCH or an EPDCCH related to the MSFS DCI.

Each of the above-described embodiments may be included as one of the methods of implementing the present invention. In this case, although each of the embodiments may be independently implemented, some of the embodiments may be implemented in combination.

In the present invention, the DL subframe may be replaced with a DwPTS or a special subframe and the UL subframe may be replaced with a UpPTS or a special subframe but the DL and UL subframes are not limited thereto.

Figure 14:
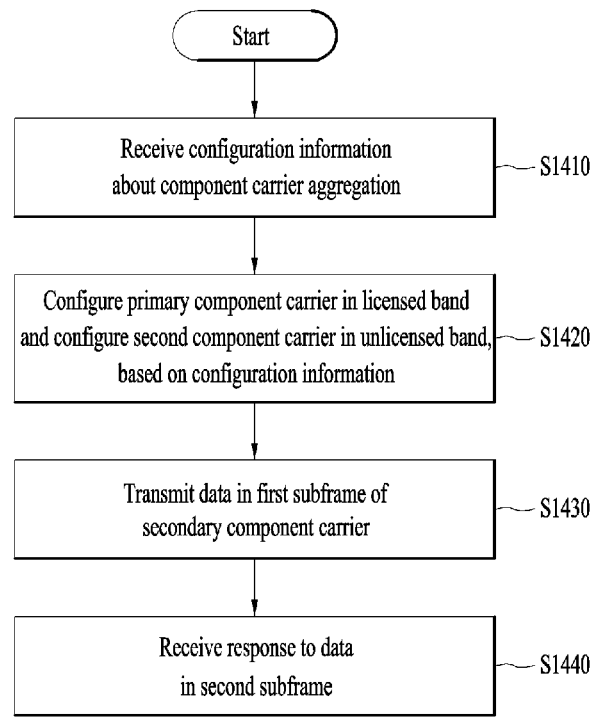
FIG. 14 illustrates a communication method using CA according to an embodiment of the present invention.

FIG. 14 illustrates a communication method using CA according to an embodiment of the present invention.

Referring to FIG. 14, a UE may receive configuration information about CA from a BS (S1410). That is, in step S1410 of FIG. 14, the UE may receive CA related information according to the above-described embodiment of the present invention. In step S1410, information/configuration/rule used by the UE to perform communication using a CA scheme may be configured as described above according to the embodiments of the present invention and may be determined by a combination of at least some of the embodiments of the present invention.

Next, the UE may configure a primary component carrier in a licensed band and configure a second component carrier in an unlicensed band, based on the configuration information (S1420). In this case, the licensed band may be a permitted band in the LTE system as described above and the unlicensed band may be a band occupied and secured based on CS. That is, the UCell RRP duration in the above-described embodiments may be the unlicensed band, as described above.

Next, the UE may transmit data in a first subframe of the secondary component carrier (S1430). The UE may receive a response to the data in a second subframe (S1440). In this case, a time interval for the second subframe in which the response is received after the first subframe in which the data is transmitted may be configured based on Embodiments 1 to 7 described above. That is, a HARQ-ACK timing for the data transmitted in the secondary component carrier may be configured according to each of the above-described embodiments or a combination of the embodiments, as described above.

The communication method using CA of the present invention described with reference to FIG. 14 may be implemented such that the various above-described embodiments of the present invention are independently performed or two or more embodiments of the present invention are simultaneously performed. Redundant matters will not be described herein for clarity.

Figure 15:
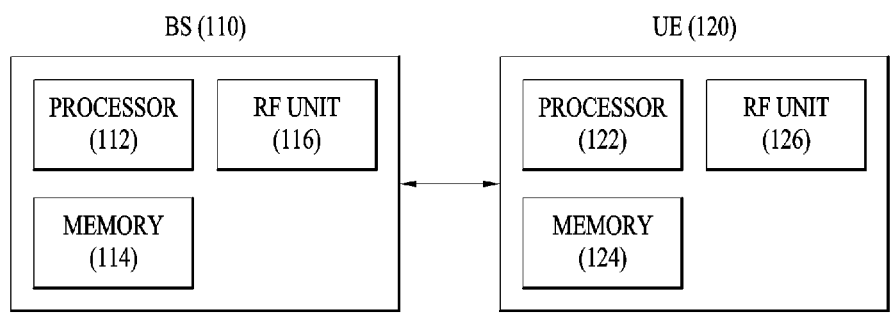
FIG. 15 illustrates a BS and a UE that are applicable to an embodiment of the present invention.

FIG. 15 illustrates a BS and a UE that are applicable to an embodiment of the present invention.

Referring to FIG. 15, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

The embodiments of the present invention may be implemented by various means, for example, by hardware, firmware, software, or a combination thereof. In a hardware configuration, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, an embodiment of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are within the scope of the invention.

INDUSTRIAL APPLICABILITY

While the above-described communication method using CA in the wireless communication system and the apparatus therefor have been described centering on an example applied to a 3GPP LTE system, the present invention is applicable to a variety of wireless communication systems in addition to the 3GPP LTE system.

The invention claimed is:

1. A method for transmitting and receiving signals by a user equipment in a wireless communication system supporting carrier aggregation, the method comprising:
receiving configuration information on component carrier aggregation;
configuring a primary component carrier for a time division duplex (TDD) mode in a licensed band and a secondary component carrier in an unlicensed band, based on the configuration information;
receiving control information for scheduling a plurality of downlink subframes on a time duration occupied for communication in the unlicensed band;
receiving downlink data in the plurality of downlink subframes scheduled based on the control information,
wherein the plurality of downlink subframes are scheduled based on multi-subframe scheduling, and
wherein a number and locations of the plurality of downlink subframes are configured based on TDD uplink-downlink configuration information of the primary component carrier; and
transmitting a response to the downlink data in a subframe of the primary component carrier,
wherein the response is transmitted at a hybrid automatic repeat and request acknowledgement/negative acknowledgement (HARQ-ACK) timing configured based on the TDD uplink-downlink configuration information of the primary component carrier, and wherein the HARQ-ACK timing is a same timing at which a response is transmitted after downlink data is transmitted on a frequency division duplex (FDD) secondary component carrier operating based on cross-carrier scheduling when a TDD primary component carrier and the FDD secondary component carrier are aggregated in the licensed band.

2. The method according to claim 1, wherein the unlicensed band is a frequency band in which an exclusive right to use is not guaranteed.

3. The method according to claim 1, wherein the plurality of downlink subframes are scheduled within downlink subframes in a bundling window.

4. The method according to claim 3, wherein a response to downlink data received in each of the plurality of downlink subframes is transmitted at a same uplink subframe timing.

5. A user equipment for transmitting and receiving signals in a wireless communication system supporting carrier aggregation, the user equipment comprising:
   a transceiver configured to transmit and receive a signal; and
   a processor configured to control the transceiver,
   wherein the processor is further configured to:
   control the transceiver to receive configuration information on component carrier aggregation;
   configure a primary component carrier for a time division duplex (TDD) mode in a licensed band and a secondary component carrier in an unlicensed band, based on the configuration information;
   control the transceiver to receive control information for scheduling a plurality of downlink subframes on a time duration occupied for communication in the unlicensed band;
   control the transceiver to receive downlink data in the plurality of downlink subframes scheduled based on the control information,
   wherein the plurality of downlink subframes are scheduled based on multi-subframe scheduling, and
   wherein a number and locations of the plurality of downlink subframes are configured based on TDD uplink-downlink configuration information of the primary component carrier; and
   control the transceiver to transmit a response to the downlink data in a subframe of the primary component carrier,
   wherein the response is transmitted at a hybrid automatic repeat and request acknowledgement/negative acknowledgement (HARQ-ACK) timing configured based on the TDD uplink-downlink configuration information of the primary component carrier, and
   wherein the HARQ-ACK timing is a same timing at which a response is transmitted after downlink data is transmitted on a frequency division duplex (FDD) secondary component carrier operating based on cross-carrier scheduling when a TDD primary component carrier and the FDD secondary component carrier are aggregated in the licensed band.

* * * * *